(12) United States Patent
Jakobsson

(10) Patent No.: US 12,135,766 B2
(45) Date of Patent: *Nov. 5, 2024

(54) AUTHENTICATION TRANSLATION

(71) Applicant: Carbyne Biometrics, LLC, New York, NY (US)

(72) Inventor: Bjorn Markus Jakobsson, New York, NY (US)

(73) Assignee: Carbyne Biometrics, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/082,395

(22) Filed: Dec. 15, 2022

(65) Prior Publication Data

US 2023/0376571 A1    Nov. 23, 2023

Related U.S. Application Data

(63) Continuation of application No. 17/861,079, filed on Jul. 8, 2022, now Pat. No. 11,556,617, which is a
(Continued)

(51) Int. Cl.
*G06F 21/00* (2013.01)
*G06F 21/10* (2013.01)
(Continued)

(52) U.S. Cl.
CPC ............ *G06F 21/10* (2013.01); *G06F 21/121* (2013.01); *G06F 21/128* (2013.01); *G06F 21/31* (2013.01); *G06F 21/32* (2013.01); *G06F 21/44* (2013.01); *H04L 63/08* (2013.01); *H04L 63/0815* (2013.01); *H04L 63/0823* (2013.01); *H04L 63/083* (2013.01); *H04L 63/0861* (2013.01);
(Continued)

(58) Field of Classification Search
None
See application file for complete search history.

(56) References Cited

U.S. PATENT DOCUMENTS

| | | | |
|---|---|---|---|
| 5,010,571 A | 4/1991 | Katznelson |
| 5,164,992 A | 11/1992 | Turk |

(Continued)

FOREIGN PATENT DOCUMENTS

| | | |
|---|---|---|
| EP | 2079023 | 7/2009 |
| WO | 2004051585 | 6/2004 |
| WO | 2005001751 | 1/2005 |

OTHER PUBLICATIONS

"Managing Authorization and Access Control", Author: unknown, Published Nov. 3, 2005, pp. 1-12, URL: http://technet.microsoft.com/en-us/library/bb457115.aspx.
(Continued)

*Primary Examiner* — Andrew J Steinle
(74) *Attorney, Agent, or Firm* — Van Pelt, Yi & James LLP

(57) ABSTRACT

Authentication translation is disclosed. A request to access a resource is received at an authentication translator, as is an authentication input. The authentication input corresponds to at least one stored record. The stored record is associated at least with the resource. In response to the receiving, a previously stored credential associated with the resource is accessed. The credential is provided to the resource.

30 Claims, 15 Drawing Sheets

Related U.S. Application Data continuation of application No. 17/123,018, filed on Dec. 15, 2020, now Pat. No. 11,475,105, which is a continuation-in-part of application No. 17/027,481, filed on Sep. 21, 2020, now Pat. No. 11,514,138, which is a continuation of application No. 16/773,767, filed on Jan. 27, 2020, now Pat. No. 10,929,512, which is a continuation of application No. 16/563,715, filed on Sep. 6, 2019, now Pat. No. 10,824,696, which is a continuation of application No. 16/273,797, filed on Feb. 12, 2019, now Pat. No. 10,521,568, which is a continuation of application No. 15/042,636, filed on Feb. 12, 2016, now Pat. No. 10,360,351, which is a continuation of application No. 13/706,254, filed on Dec. 5, 2012, now Pat. No. 9,294,452.

(60) Provisional application No. 61/587,387, filed on Jan. 17, 2012, provisional application No. 61/569,112, filed on Dec. 9, 2011.

(51) Int. Cl.
  *G06F 21/12* (2013.01)
  *G06F 21/31* (2013.01)
  *G06F 21/32* (2013.01)
  *G06F 21/44* (2013.01)
  *H04L 9/40* (2022.01)

(52) U.S. Cl.
  CPC ............ *H04L 63/10* (2013.01); *H04L 63/20* (2013.01); *H04L 63/0281* (2013.01); *H04L 63/0869* (2013.01)

(56) References Cited

U.S. PATENT DOCUMENTS

| | | | |
|---|---|---|---|
| 5,499,298 A | 3/1996 | Narasimhalu | |
| 5,930,804 A | 7/1999 | Yu | |
| 6,016,476 A | 1/2000 | Maes | |
| 6,691,232 B1 | 2/2004 | Wood | |
| 7,512,965 B1 | 3/2009 | Amdur | |
| 7,516,074 B2 | 4/2009 | Bilobrov | |
| 7,697,729 B2 | 4/2010 | Howell | |
| 7,779,268 B2 | 8/2010 | Draper | |
| 7,780,080 B2 | 8/2010 | Owen | |
| 7,814,332 B2 | 10/2010 | Beenau | |
| 7,856,472 B2 | 12/2010 | Arav | |
| 7,950,051 B1 | 5/2011 | Spitz | |
| 8,099,789 B2 | 1/2012 | Challener | |
| 8,145,916 B2 | 3/2012 | Boshra | |
| 8,150,772 B2 | 4/2012 | Mardikar | |
| 8,160,877 B1 | 4/2012 | Nucci | |
| 8,185,646 B2 | 5/2012 | Headley | |
| 8,355,530 B2 | 1/2013 | Park | |
| 8,386,620 B2 | 2/2013 | Chatterjee | |
| 8,533,485 B1 | 9/2013 | Bansal | |
| 8,549,300 B1 | 10/2013 | Kumar | |
| 8,577,813 B2 | 11/2013 | Weiss | |
| 8,776,214 B1* | 7/2014 | Johansson | H04L 63/08 726/19 |
| 8,799,666 B2 | 8/2014 | Kesanupalli | |
| 8,856,539 B2 | 10/2014 | Weiss | |
| 8,954,500 B2 | 2/2015 | Marlow | |
| 8,984,596 B2 | 3/2015 | Griffin | |
| 9,100,826 B2 | 8/2015 | Weiss | |
| 9,652,629 B2 | 5/2017 | Brown | |
| 10,360,351 B1 | 7/2019 | Jakobsson | |
| 10,373,173 B2 | 8/2019 | Winner | |
| 10,872,152 B1 | 12/2020 | Martel | |
| 2004/0107170 A1 | 6/2004 | Labrou | |
| 2004/0117636 A1 | 6/2004 | Cheng | |
| 2004/0236632 A1 | 11/2004 | Maritzen | |
| 2005/0198348 A1 | 9/2005 | Yeates | |
| 2006/0085844 A1 | 4/2006 | Buer | |
| 2006/0158307 A1 | 7/2006 | Lee | |
| 2006/0271460 A1 | 11/2006 | Hanif | |
| 2006/0282660 A1 | 12/2006 | Varghese | |
| 2007/0100913 A1 | 5/2007 | Sumner | |
| 2007/0257104 A1* | 11/2007 | Owen | G06Q 20/4014 235/382 |
| 2007/0266256 A1 | 11/2007 | Shah | |
| 2008/0059804 A1* | 3/2008 | Shah | H04L 63/083 726/8 |
| 2008/0098478 A1* | 4/2008 | Vaidya | G06F 21/34 713/176 |
| 2008/0104416 A1 | 5/2008 | Challener | |
| 2008/0270038 A1 | 10/2008 | Partovi | |
| 2009/0100269 A1 | 4/2009 | Naccache | |
| 2009/0135188 A1 | 5/2009 | Ding | |
| 2009/0157560 A1 | 6/2009 | Carter | |
| 2009/0191846 A1 | 7/2009 | Shi | |
| 2009/0288012 A1 | 11/2009 | Hertel | |
| 2010/0014720 A1 | 1/2010 | Hoyos | |
| 2010/0042535 A1 | 2/2010 | Stone | |
| 2010/0242102 A1 | 9/2010 | Cross | |
| 2010/0317335 A1 | 12/2010 | Borovsky | |
| 2011/0078771 A1 | 3/2011 | Griffin | |
| 2011/0138450 A1 | 6/2011 | Kesanupalli | |
| 2011/0205016 A1 | 8/2011 | Al-Azem | |
| 2011/0231651 A1 | 9/2011 | Bollay | |
| 2011/0238855 A1* | 9/2011 | Korsunsky | H04L 63/1441 709/231 |
| 2012/0110341 A1 | 5/2012 | Beigi | |
| 2012/0117348 A1* | 5/2012 | Triantafillou | G06F 21/566 711/163 |
| 2012/0150808 A1 | 6/2012 | Hubner | |
| 2012/0167193 A1 | 6/2012 | Gargaro | |
| 2014/0250079 A1 | 9/2014 | Gardner | |
| 2017/0230179 A1 | 8/2017 | Mannan | |

OTHER PUBLICATIONS

Brands et al. Distance-Bounding Protocols. Jan. 28, 1994: https://citeseerx.ist.psu.edu/viewdoc/download?doi=10.1.1.51.6437&rep=rep1&type=pdf.

Hammer-Lahav, Ed. "The OAuth 1.0 Protocol", from https://tools.ietf.org/html/rfc5849, Apr. 2010.

IPR2022-00244 Claim Mapping Table for the '696 Patent. Nov. 30, 2021.

IPR2022-00244 Petition for Inter Partes Review of U.S. Pat. No. 10,824,696. Nov. 30, 2021.

IPR2022-00251 Claim Mapping Table for the '512 Patent. Dec. 1, 2021.

IPR2022-00251 Petition for Inter Partes Review of U.S. Pat. No. 10,929,512. Dec. 1, 2021.

Jakobsson et al. Proving Without Knowing: on Oblivious, Agnostic and Blindfolded Provers. Jul. 24, 1996: http://markus-jakobsson.com/papers/jakobsson-crypto96.pdf.

Monrose et al. Using Voice to Generate Cryptographic Keys. May 13, 2001: https://www.cs.unc.edu/~fabian/papers/odyssey.pdf.

Seshadri et al. Pioneer: Verifying Code Integrity and Enforcing Untampered Code Execution on Legacy Systems. Oct. 23, 2005: https://netsec.ethz.ch/publications/papers/pioneer.pdf.

Batten et al., pStore: A Secure Peer-to-Peer Backup System, LCS Technical Memos (1974-2003), MIT-LCS-TM-632, Oct. 2002, 14 pages, https://dspace.mit.edu/handle/1721.1/149321?show=full.

Bhargav-Spantzel et al., Privacy Preserving Multi-Factor Authentication with Biometrics, DIM '06: Proceedings of the second ACM workshop on Digital identity management, Nov. 2006, pp. 63-71.

Bidgoli, Handbook of Computer Networks, Distributed Networks, Network Planning, Control, Management, and New Trends and Applications, vol. 3, 2008, 22 pages.

Campbell, Jr., Speaker Recognition: A Tutorial, Proceedings of the IEEE, vol. 85, No. 9, Sep. 1997, pp. 1437-1462.

Chervenak et al., Protecting File Systems: A Survey of Backup Techniques, Joint NASA and IEEE Mass Storage Conference, vol. 99, Mar. 23, 1998, pp. 17-32.

(56) References Cited

OTHER PUBLICATIONS

Derene, How to Restore Your Data After a Hard Drive Crash, Popular Mechanics, New Technology, Best New Gadgets, Aug. 4, 2011, 9 pages, https://www.popularmechanics.com/technology/gadgets/how-to/a6819/how-to-restore-your-data-after-a-hard-drive-crash/.

Dierks et al., The TLS Protocol Version 1.0, IETF, Jan. 1999, 69 pages, https://www.ietf.org/rfc/rfc2246.txt.

Ekler et al., Similarity Management in Phonebook-centric Social Networks, 2009 Fourth International Conference on Internet and Web Applications and Services, Jan. 2009, pp. 273-279, https://www.researchgate.net/publication/220880693.

Federal Deposit Insurance Corporation, Authentication in an Internet Banking Environment, FFIEC Guidance, Inactive Financial Institution Letters, Oct. 12, 2005, 2 pages, https://www.fdic.gov/news/inactive-financial-institution-letters/2005/fil10305.html.

Federal Financial Institutions Examination Council, Authentication in an Internet Banking Environment, Guidance PDF from FFIEC Press Release, Oct. 12, 2005, 14 pages, https://www.ffiec.gov/press/pr101205.htm.

Federal Financial Institutions Examination Council, FFIEC Releases Guidance on Authentication in Internet Banking Environment, FFIEC Press Release, Oct. 12, 2005, 2 pages, https://www.ffiec.gov/press/pr101205.htm.

Freier et al., The Secure Sockets Layer (SSL) Protocol Version 3.0, IETF Datatracker RFC 6101, Aug. 2011, 67 pages, https://datatracker.ietf.org/doc/html/rfc6101.

Germain, IBM Introducing Fingerprint Reader Into Laptop, TechNews World, Security, Oct. 4, 2004, 11 pages, https://www.technewsworld.com/story/IBM-introducing-fingerprint-reader-into-laptop-37017.html.

Heusch et al., Local Binary Patterns as an Image Preprocessing for Face Authentication, IDIAP Research Report 05-76, Nov. 2005, 12 pages.

Infineon, TPM Key Backup and Recovery For Trusted Platforms, Infineon White Paper, V0.95, Sep. 21, 2006, 17 pages, www.infineon.com/TPM.

IPR2024-00329 Petition for Inter Partes Review of U.S. Pat. No. 9,972,010, Jan. 30, 2024, 104 pages.

IPR2024-00330 Petition for Inter Partes Review of U.S. Pat. No. 10,713,656, Jan. 30, 2024, 100 pages.

IPR2024-00331 Petition for Inter Partes Review of U.S. Pat. No. 11,526,886, Jan. 30, 2024, 109 pages.

IPR2024-00332 Petition for Inter Partes Review of U.S. Pat. No. 10,929,512, Jan. 19, 2024, 86 pages.

IPR2024-00333 Petition for Inter Partes Review of U.S. Pat. No. 11,475,105, Jan. 31, 2024, 81 pages.

IPR2024-00334 Petition for Inter Partes Review of U.S. Pat. No. 11,514,138, Jan. 19, 2024, 86 pages.

IPR2024-00507 Petition for Inter Partes Review of U.S. Pat. No. 11,475,105, Jan. 31, 2024, 86 pages.

Kollreider et al., Verifying Liveness by Multiple Experts in Face Biometrics, 2008 IEEE Computer Society Conference on Computer Vision and Pattern Recognition Workshops, Jun. 23-28, 2008, 6 pages.

Microsoft Press, Computer Dictionary Second Edition, The Comprehensive Standard For Business, School, Library, and Home, 1994, 8 pages.

Narayanan, De-anonymizing Social Networks, 2009 30th IEEE Symposium on Security and Privacy, May 17-20, 2009, pp. 173-187.

Neuman et al., Kerberos: An Authentication Service for Computer Networks, USC/ISI Technical Report number ISI/RS-94-399, IEEE Communications Magazine, vol. 32, No. 9, Sep. 1994, 10 pages, https://gost.isi.edu/publications/kerberos-neuman-tso.html.

Neuman et al., The Kerberos Network Authentication Service (V5), Ietf, Jul. 2005, 119 pages, https://www.ietf.org/rfc/rfc4120.txt.

Oracle, Oracle Buys Bharosa: Delivers Next-Generation Risk-Based Access Management, Overview and Frequently Asked Questions, 2007, 4 pages.

Rescorla, http Over TLS, IETF Datatracker RFC 2818, May 2000, 7 pages, https://datatracker.ietf.org/doc/html/rfc2818.

Scarfone et al., Guide to Bluetooth Security, Recommendations of the National Institute of Standards and Technology, U.S. Department of Commerce, Special Publication 800-121, Sep. 2008, 43 pages.

TC Group, ISO/IEC 11889-1:2009(en) Information technology: Trusted Platform Module—Part 1: Overview, May 2009, 6 pages, https://www.iso.org/standard/50970.html.

Trusted Computing Group, Enterprise Security: Putting the TPM to Work, White Paper, 2008, 2 pages.

Trusted Computing Group, Tpm Main Part 3 Commands, Specification Version 1.2, Level 2 Revision 116, Mar. 1, 2011, 339 pages.

Tseitlin, Embracing Failure to Improve Resilience and Maximize Availability, The Antifragile Organization, ACM Queue 11, No. 6, Jun. 8, 2013, pp. 1-7.

Varshavsky et al., Amigo: Proximity-Based Authentication of Mobile Devices, UbiComp 2007: Ubiquitous Computing, LNCS vol. 4717, 2007, pp. 253-270.

Vasalou et al., Avatars in social media: Balancing accuracy, playfulness and embodied messages, ScienceDirect, Int. Journal of Human-Computer Studies 66, May 9, 2008, pp. 801-811.

Zeidman, Introduction to Programmable Systems on a Chip, EE Times, Design Lines, Programmable Logic Designline, Jul. 27, 2005, 12 pages, https://www.eetimes.com/introduction-to-programmable-systems-on-a-chip/.

* cited by examiner

AUTHENTICATION TRANSLATION

CROSS REFERENCE TO OTHER APPLICATIONS

This application is a continuation U.S. patent application Ser. No. 17/861,079 entitled AUTHENTICATION TRANSLATION filed Jul. 8, 2022, which is incorporated herein by reference for all purposes, which is a continuation of U.S. patent application Ser. No. 17/123,018 entitled AUTHENTICATION TRANSLATION filed Dec. 15, 2020, now U.S. Pat. No. 11,475,105 which is incorporated herein by reference for all purposes, which is a continuation in part of U.S. patent application Ser. No. 17/027,481 entitled AUTHENTICATION TRANSLATION filed Sep. 21, 2020, now U.S. Pat. No. 11,514,138, which is incorporated herein by reference for all purposes, which is a continuation of U.S. patent application Ser. No. 16/773,767 entitled AUTHENTICATION TRANSLATION filed Jan. 27, 2020, now U.S. Pat. No. 10,929,512, which is incorporated herein by reference for all purposes, which is a continuation of U.S. patent application Ser. No. 16/563,715 entitled AUTHENTICATION TRANSLATION filed Sep. 6, 2019, now U.S. Pat. No. 10,824,696, which is incorporated herein by reference for all purposes, which is a is a continuation of U.S. patent application Ser. No. 16/273,797 entitled AUTHENTICATION TRANSLATION filed Feb. 12, 2019, now U.S. Pat. No. 10,521,568, which is incorporated herein by reference for all purposes, which is a is a continuation of U.S. patent application Ser. No. 15/042,636 entitled AUTHENTICATION TRANSLATION filed Feb. 12, 2016, now U.S. Pat. No. 10,360,351, which is incorporated herein by reference for all purposes, which is a continuation of U.S. patent application Ser. No. 13/706,254 entitled AUTHENTICATION TRANSLATION filed Dec. 5, 2012, now U.S. Pat. No. 9,294,452, which is incorporated herein by reference for all purposes, which claims priority to U.S. Provisional Application No. 61/587,387 entitled BIOMETRICS-SUPPORTED SECURE AUTHENTICATION SYSTEM filed Jan. 17, 2012 which is incorporated herein by reference for all purposes. U.S. patent application Ser. No. 13/706,254 also claims priority to U.S. Provisional Patent Application No. 61/569,112 entitled BACKWARDS COMPATIBLE ROBUST COOKIES filed Dec. 9, 2011, which is incorporated herein by reference for all purposes.

BACKGROUND OF THE INVENTION

Providing credentials to a service, whether via a mobile or other device, is often a tedious experience for a user. Unfortunately, to make authentication easier for themselves, users will often engage in practices such as password re-use, and/or the selection of poor quality passwords, which render their credentials less secure against attacks. Accordingly, improvements in authentication techniques would be desirable. Further, it would be desirable for such improvements to be widely deployable, including on existing/legacy systems.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
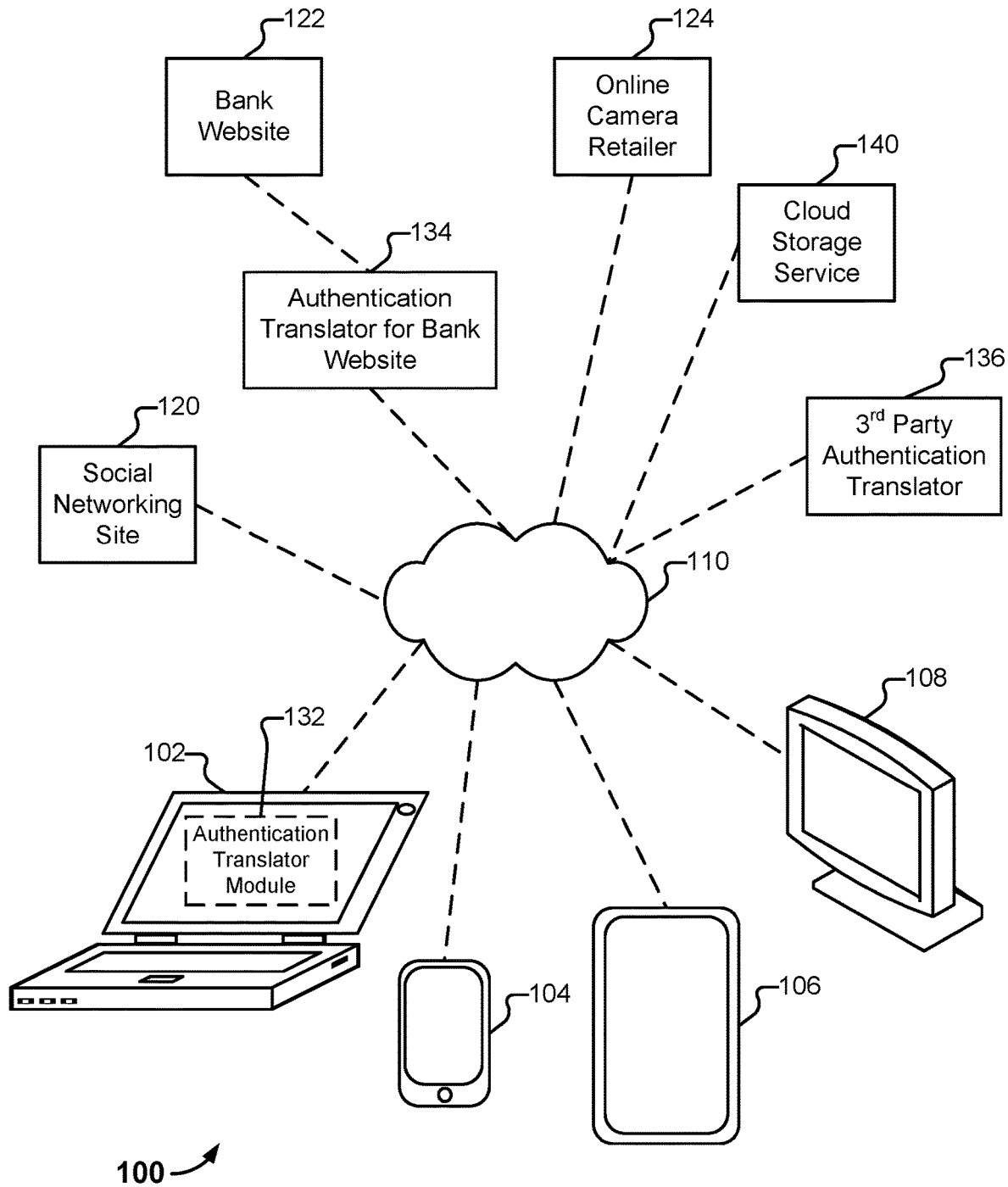
FIG. 1 illustrates an embodiment of an environment in which authentication translation is provided.

FIG. 1 illustrates an embodiment of an environment in which authentication translation is provided. In the example shown, a variety of client devices 102-108 connect, via one or more networks (represented as a single network cloud 110) to a variety of services 120-124 (also referred to herein as sites 120-124). In particular, client device 102 is a notebook computer owned by a user hereinafter referred to as Alice. Notebook 102 includes a camera, a microphone, and a fingerprint sensor. Client device 104 is a smartphone, also owned by Alice. Client device 104 includes a camera. Client device 106 is a tablet owned by Bob, and sometimes used by Bob's son Charlie. Client device 106 includes a camera and a fingerprint sensor. Client device 108 is a kiosk located in the lobby of a hotel. Kiosk 108 includes a camera and a microphone. The techniques described herein can be used with or adapted to be used with other devices, as applicable. For example, the techniques can be used in conjunction with gaming systems, with peripheral devices such as mice, and with embedded devices, such as door locks.

Service 120 is a social networking site. Service 122 is a website of a bank. Service 124 is the online store of a boutique camera retailer. Each of services 120-124 requires a username and password (and/or a cookie) from a user prior to giving that user access to protected content and/or other features. As will be described in more detail below, using the techniques described herein, users need not type such usernames and passwords into their devices whenever required by a service. Instead, users can authenticate themselves to an "authentication translator" via an appropriate technique, and the authentication translator will provide the appropriate credentials to the implicated service on the user's behalf. Also as will be described in more detail below, authentication translators can be located in a variety of places within an environment. For example, notebook computer 102 includes an authentication translator module 132 that provides authentication translation services. The other devices 104-108 can also include (but need not include) their own respective authentication translator modules. The owner of bank website 122 also operates an authentication translator 134 associated with the bank. Finally, authentication translator 136 provides authentication translation services to a variety of businesses, including online camera retailer 124.

Figure 2:
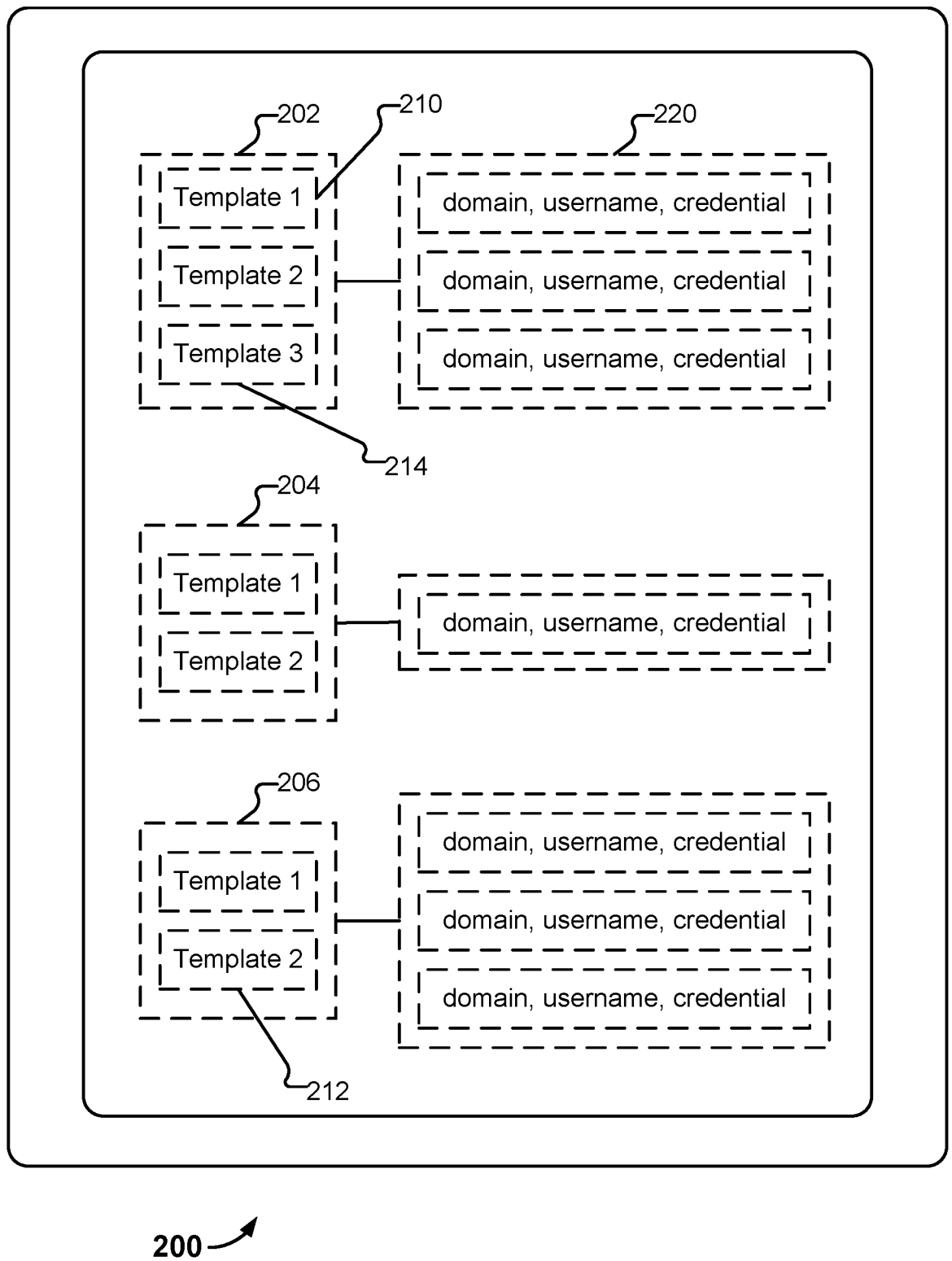
FIG. 2 illustrates an embodiment of credential information stored on a device.

FIG. 2 illustrates an embodiment of credential information stored on a device. In particular, device 200 stores three user profiles 202-206, each of which contains a username and one or more templates (e.g., template 210) associated with the user. In various embodiments, a template is a collection of biometric features. Using fingerprints as an example type of biometric, a corresponding template includes a collection of patterns, minutia, and/or other features that can be matched against to determine if a person's fingerprint matches the fingerprint of the registered user (i.e., the owner of a given user profile). A representation of a single fingerprint may be included in multiple templates (e.g., in different resolutions, in accordance with different protocols, as captured during warm vs. cold conditions, and/or by itself or in combination with multiple fingerprints). When other biometrics are employed (e.g., facial recognition, voiceprint, or retina scan technology), features appropriate to those types of biometrics are included in the template. Other types of features can also be included in templates. As one example, a user's typing speed and/or accuracy can be measured by a device, such as device 102, and used to distinguish between multiple users of a device. For example, suppose Alice types at 100 words per minute and rarely makes mistakes. A representation of this information can be stored in template 212. Also suppose Alice's niece, who sometimes uses Alice's laptop computer when visiting Alice types at 20 words per minute and makes many mistakes. In some embodiments, the fact that a user was recently (e.g., within the last 5 minutes) typing on laptop 102 at 90 words per minute is evidence of a match against template 212. In this case, the typing speed of 90 words per minute is similar enough to Alice's typical behavior, it is considered a match. Various policies can be included in a profile that govern how matches are to be performed. For example, policies can specify thresholds/tolerances for what constitutes a match, and can specify that different levels of matches can result in different levels of access to different resources.

A profile is associated with a vault (e.g., vault 220). The vault, in turn, contains triples specifying a service provider/domain, a username, and a credential. The vault can also contain other sensitive user information, such as account numbers, address/phone number information, and health care data. The credential for a service provider/domain can be a password (e.g., for legacy servers), and can also take alternate forms (e.g., a cryptographic key for service providers supporting stronger authentication methods).

In some embodiments, profiles, templates, and vaults (collectively "authentication information") are stored entirely in an unprotected storage area, and are stored in the clear. In other embodiments, secure storage techniques are used to secure at least a portion of the authentication information.

Figure 3:
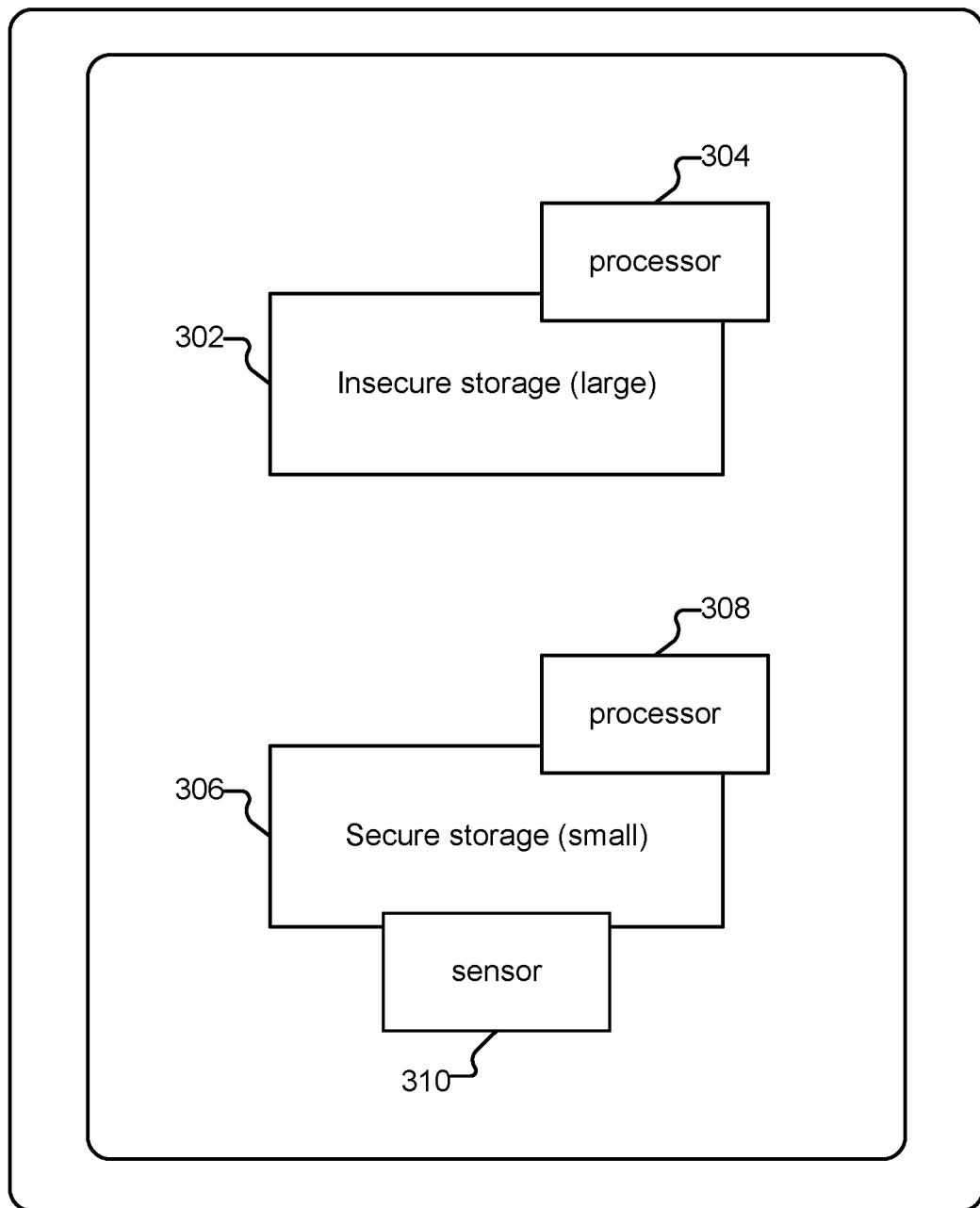
FIG. 3 illustrates an embodiment of a device with secure storage.

One example of a device with secure storage is illustrated in FIG. 3. In the example shown, a mobile phone 300 includes a large and insecure storage 302 attached to a fast processor 304, and a smaller but secure storage 306 attached to a dedicated processor 308 and a sensor 310 (e.g., a camera or a fingerprint reader). Users (and applications) can read from and write to the insecure storage area. However, users cannot access the secure storage area, and the fast processor can only communicate with the dedicated processor/sensor via a restricted API. As another example, a unique decryption key associated with a given vault can be stored in a profile. The vault is an encrypted and authenticated container that can be stored on insecure storage, e.g., on the device, and also backed up (e.g., to a cloud storage service 140 or to an alternate form of external storage). As needed, authentication information or portions thereof can be loaded into secure storage and decrypted. For example, one can use AES to encrypt the files one by one, using a key stored on the secured storage. A message authentication technique, such as HMAC, can be used for authenticating the encrypted files to provide tamper prevention. Profiles and vaults can be updated while in secure storage; if this occurs, they are encrypted and MACed before being written back to the insecure storage, which may in turn propagate them to external backup storage. In yet other embodiments, profiles and vaults are stored entirely in secure storage, in plaintext, which allows them to be both read and written—and in particular, searched.

Example Transaction Types

A variety of transaction types can take place in the environment shown in FIG. 1, examples of which are discussed in this section.

Initial Registration

In order to begin using the techniques described herein, users perform some form of initial registration. As one example, suppose Alice launches an enrollment program installed on laptop 102. She uses the program to capture various biometric information (e.g., fingerprints, photographs of her face, etc.). A user profile is created for Alice, and the biometric information captured about her is encoded into a plurality of templates, such as templates 210 and 214. In some embodiments, Alice is also explicitly asked to supply credential information for services she would like to use, such as by providing the domain name of social networking site 120, along with her username and password for site 120. In other embodiments, domain/username/credential information is at least passively captured on Alice's behalf and included in one or more vaults such as vault 220. Credential information can also be important from a browser password manager already in use by Alice or other appropriate source. In some embodiments, Alice also registers with cloud storage service 140, which will allow her to back up her authentication information and to synchronize it across her devices (e.g., 102 and 104), as described in more detail below.

Other registration approaches can also be used. For example, registration can be integrated into the experience the first time a device is used. Thus, when Bob first turns on tablet 106, he may be prompted to take a picture of his face (with a profile/templates being created in response). Similarly, the first time Charlie uses tablet 106, the techniques described herein can be used to determine that Charlie does not yet have a profile (e.g., because none of the templates already present on tablet 106 match his biometrics) and Charlie can be prompted to enroll as a second user of the device.

Authentication

Suppose Alice wishes to authenticate to banking website 122. Using a fingerprint reader incorporated into her laptop, she performs a fingerprint scan, which causes her biometric features to be extracted and compared to any stored templates residing on her computer. If a match is found, an associated decryption key is selected, and the associated vault is loaded and decrypted. The vault is scanned for an entry that matches the selected service provider (i.e., website 122). If a matching entry is found, the associated domain, username, and site credential are extracted from the vault. In some embodiments, the validity of the domain name mapping is verified at this point to harden the system against domain name poisoning. Next, a secure connection is established between Alice's computer and the service provider, and Alice is authenticated. For service providers supporting strong user authentication, mutual SSL can be used, for example. A variety of policies can be involved when performing matching. For example, to access certain domains, Alice's print may need only match template 210. To access other domains, Alice may need to match multiple templates (e.g., both 210 and 214). As another example, in order to access social networking site 120, Alice may merely need to be sitting in front of her computer, which has an integrated webcam. Even in relatively low light conditions, a match can be performed against Alice's face and features stored in a template. However, in order to access bank website 122, Alice may need a high quality photograph (i.e., requiring her to turn on a bright light) and may need to demonstrate liveness (e.g., by blinking or turning her head). As yet another example, other contextual information can be included in policies. For example, if Alice's IP address indicates she is in a country that she is not usually in, she may be required to match multiple templates (or match a template with more/better quality features) in order to access retailer 124, as distinguished from when her IP address indicates she is at home.

In some embodiments, the biometric sensor used by a user may be a peripheral device (e.g., a mouse with an integrated fingerprint scanner that is connected to the user's primary device via USB). In such scenarios, the peripheral device may be responsible for storing at least a portion of authentication information and may perform at least some of the authentication tasks previously described as having been performed by Alice's computer. For example, instead of processors 304 and 308, and storages 302 and 306 being collocated on a single device (e.g., laptop 102), processor 304 and storage 302 may be present on a primary device, and processor 308 and storage 306 may be present on a peripheral device (e.g., that also includes a sensor, such as a fingerprint reader).

In such scenarios, once Alice's login to banking website 122 is successfully completed, the secure session can be handed over from the peripheral device to the primary device, in a way that does not allow the primary device retroactive access to the plaintext data of the transcripts exchanged between the peripheral device and the service provider. One way this can be accomplished is by renegotiating SSL keys between the peripheral device and the website, after which the newly negotiated key can be handed off from the peripheral device to the primary device. This avoids retroactive credential capture in a setting where the device is infected by malware.

Figure 4:
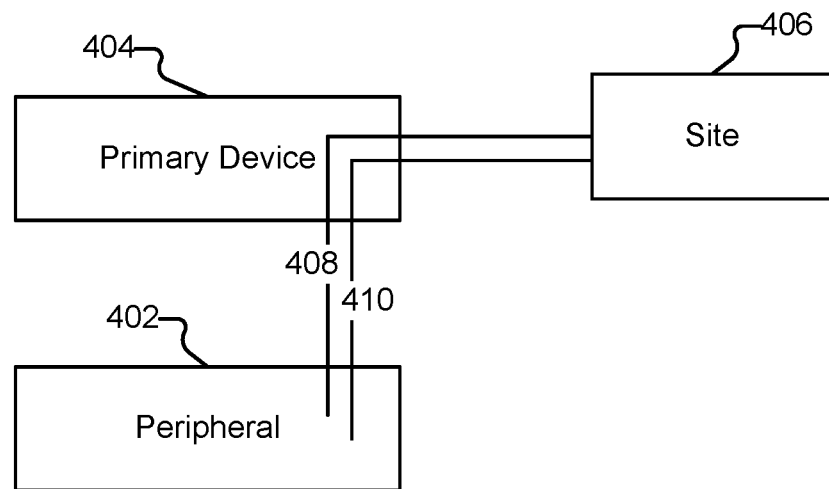
FIG. 4 illustrates an example of a renegotiation.

An example of renegotiation is depicted in FIG. 4. Specifically, after a user has successfully authenticated to a fingerprint reader, a login is performed to a service provider. Using the primary device (404) as a proxy, the peripheral fingerprint reader 402 negotiates a first SSL connection (408) with a service provider 406, over which credentials are exchanged. The proxy then renegotiates SSL (410), which replaces the old key with a new one. The new key is disclosed to the device, which then seamlessly takes over the connection with the service provider and performs the transaction protected by the authentication. The credentials exchanged during the first SSL connection cannot be accessed by device 404, since the key of the renegotiated session is independent of the key of the original session; this provides protection against malware residing on the device. Renegotiation can be used when the primary device 404 is believed to be in a safe state when performing the negotiation of the SSL connection, but it is not known whether it is in a safe state during the transaction protected by the authentication. Renegotiation can also be used when a secure component of the primary device 404 performs the negotiation of the SSL connection and another and potentially insecure component of the primary device 404 is involved in the transaction protected by the authentication.

Figure 5:
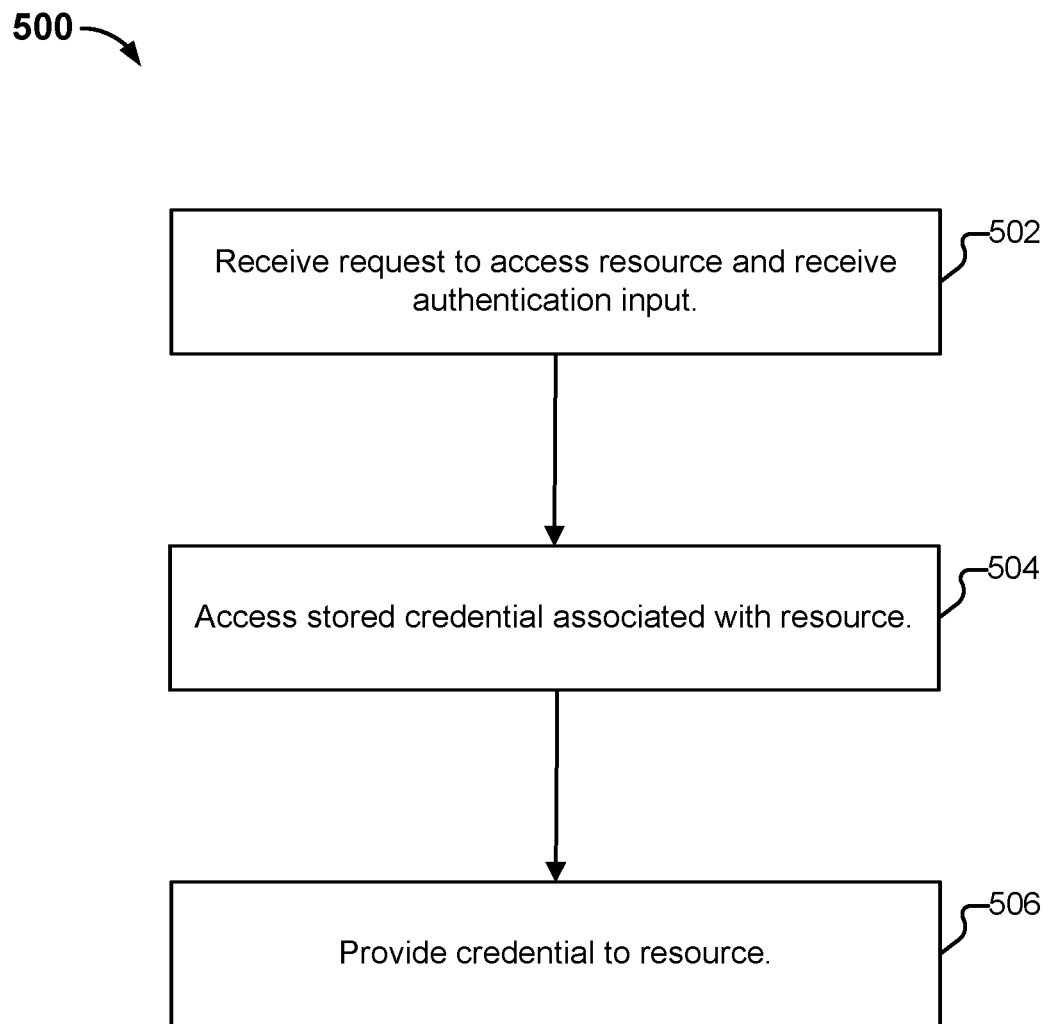
FIG. 5 illustrates an embodiment of a process for performing authentication translation.

FIG. 5 illustrates an embodiment of a process for performing authentication translation. The process begins at 502 when a request to access a resource is received, as is an authentication input. One example of the processing performed at 502 is as follows. Suppose Alice wishes to sign into social networking website 120. She directs a web browser application installed on client 102 to the social networking website. Authentication translator module 132 recognizes, from the context of Alice's actions (e.g., that she is attempting to access site 120 with her browser) that she would like to access a particular resource. Authentication translator module 132 prompts Alice (e.g., by a popup message or via a sound) to provide biometric information (e.g., to use the integrated fingerprint reader on her laptop). In some embodiments, the translator module does not prompt Alice, for example, because Alice has been trained to provide biometric information automatically when attempting to access certain resources. In yet other embodiments, the translator module only prompts Alice if she fails to provide acceptable biometric information within a timeout period (e.g., 30 seconds).

Module 132 compares Alice's supplied biometric data to the templates stored on her computer. If a suitable match is found, and if an entry for site 120 is present in the applicable vault, at 504, a previously stored credential associated with the resource is accessed. In particular, the username and password for the website, as stored in a vault, such as vault 220, are retrieved from the vault.

Finally, at 506, the credential is provided to the resource. For example, Alice's username and password for site 120 are transmitted to site 120 at 506. The credential can be transmitted directly (e.g., by the module or by Alice's computer) and can also be supplied indirectly (e.g., through the use of one or more proxies, routers, or other intermediaries, as applicable).

Other devices can also make use of process 500 or portions thereof. For example, when Alice launches a banking application on phone 104, implicit in her opening that application is her desire to access the resources of website 134. The application can take Alice's picture and compare it to stored templates/vault information. If an appropriate match is found, a credential can be retrieved from the vault on her phone (or, e.g., retrieved from cloud storage service 140) and provided to website 134.

As another example, suppose Charlie is using tablet 106 and attempts to visit site 120, whether via a dedicated application or via a web browser application installed on the tablet. Charlie's photograph is taken, and then compared against the profiles stored on tablet 106 (e.g., both Bob and Charlie's profiles). When a determination is made that Charlie's photograph matches a template stored in his stored profile (and not, e.g., Bob's), Charlie's credentials for site 120 are retrieved from a vault and transmitted by an authentication translator module residing on client 106.

As yet another example, kiosk 108 can be configured to provide certain local resources (e.g., by displaying a company directory or floor plan on demand) when users speak certain requests into a microphone. Enrolled users (e.g., with stored voiceprint or facial recognition features) can be granted access to additional/otherwise restricted services in accordance with the techniques described herein and process 500.

New Device

In some embodiments, to register a new device, a user provides an identifier, such as a username or an account number to the device. The new device connects to an external storage (such as cloud storage 140), provides the user identifier and credential, and downloads the user's templates/vaults from the service. In some embodiments, the templates/vaults are encrypted. Once downloaded, the template is decrypted and stored in a secure storage area, while the still encrypted vault can be stored in insecure storage. The decryption key can be generated from information the user has/knows, or from biometric data—such as features extracted from fingerprinting of all ten fingers. In some embodiments, more arduous fingerprinting is required for the setup of a new device than for regular authentication to avoid that a new device gets registered by a user thinking she is merely authenticating—or worse still, simply touching the device. Moreover, it translates into higher entropy of the decryption keys.

Backup Authentication

Backup authentication allows a user, such as Alice, to access resources in the event she is unable to or unwilling to interact with a particular biometric sensor. As one example, instead of having a single template associated with her profile, Alice can have multiple templates associated with it, e.g., where the first template includes fingerprint features and the second template includes voice biometric, facial recognition, or iris detection features. As a second example, where the service Alice is connecting to is a legacy website (i.e., one that users authenticate to using usernames and passwords), such a service would allow the use of passwords and password reset mechanisms by Alice without requiring Alice to use a fingerprint reader.

In various embodiments, environment 100 supports the ability of users (e.g., under duress) to release the contents of their vaults. For example, if Alice was physically threatened with the loss of a finger by a criminal, Alice could instead release the contents of her vault(s)—the ultimate goal of the criminal. As one example, in the event Alice supplies all 10 fingerprints to the sensor, provides a special password, or supplies a fingerprint and a second identifier, a cleartext version of her vault(s) could be made available.

Access Policies

In various embodiments, cloud storage service 140 is configured to accept backups from multiple devices associated with a single account, and synchronize the updates so that all devices get automatically refreshed. For example, Alice's laptop 102 and phone 104 could both communicate with cloud storage service 140 which would keep their authentication information synchronized. Refreshes can also be made in accordance with user-configured restrictions. For example, Alice's employer could prevent privileged employer data from being stored on shared personal devices, or on any device that was not issued by the employer. As another example, arbitrary policies can be defined regarding the access to and synchronization of software and data, and to tie a license or access rights to a person (and her fingerprint) rather than to a device. As yet another example, in some embodiments (e.g., where a device is made publicly available or otherwise shared by many users), no or a reduced amount of authentication information resides on a device, and at least a portion of authentication information is always retrieved from cloud storage service 140.

Remote Wiping

Remote wiping of a user's authentication information (e.g., templates) can be used both to "unshare" previously shared devices (e.g., where Bob and Charlie both have user profiles on their shared tablet 106), and to avoid that criminals with physical component access to lost devices gain access to templates and vault contents. In some embodiments, polices such as ones where a template self-wipes if it is not matched within a particular duration of time are supported. Since user data can be frequently backed up to the cloud storage, and recovered from this using the new device registration process, inconvenience to the user will be minimized.

Legacy Server Support

New authentication schemes typically require changes to a significant codebase residing with service providers. If the code is well written and documented, such changes may be relatively simple. Commonly, though, this may not be so. The engineers who originally wrote the code of relevance may have long since left the company; the code they left behind may be poorly documented—if documented at all. In severe cases, the legacy code may have been written in an outdated programming language or written in a way that does not follow guidelines for good code. This makes updates to the codebase impractical or virtually impossible in many common cases. Even if none of these challenges complicate the desired modifications, it is commonly a great bureaucratic burden to obtain permission to make modifications (e.g., to store an extra field in a backend database), because every affected part of the organization may need to review the request.

As will be described in the following section, the technologies described herein can be used in conjunction with legacy servers (e.g., existing servers that rely on usernames and passwords to authenticate users), and in particular, can be used without requiring modification to such legacy servers.

Cookies

Cookies are commonly used by legacy servers for user authentication. Unfortunately, cookies have several problems. For one thing, they are sometimes deleted—whether explicitly/intentionally by the end user or by the user's software. In addition, cookies are commonly stolen. Approaches such as cache cookies and identification using user agents can be more resistant to these problems, however, they have their own problems. For example, their use requires new code and new fields in the credential database stored by the server.

In some embodiments, authentication translators, such as translators 134 and 136 (also referred to herein as proxies) provide authentication translation services on behalf of associated services. Translators 134 and 136 are illustrated as single logical devices in FIG. 1. In some embodiments, the translators comprise standard commercially available server hardware (e.g., a multi-core processor, 4+ Gigabytes of RAM, and one or more Gigabit network interface adapters) and run typical server-class operating systems (e.g., Linux). Translators 134 and 136 can also be implemented using a scalable, elastic architecture and may comprise several distributed components, including components provided by one or more third parties. For example, translators 134 and 136 may store user credential information or may task cloud storage service 140 with storing at least a portion of that information.

In the case of authentication translator 134, service is provided with respect to bank website 122 only. Authentication translator 134 is positioned between a legacy web server (122) and the Internet (110)—and therefore between the legacy server and any client devices. Authentication translator 134 is configured to translate traffic between the legacy server and client devices so that the client devices (and respective users) perceive the new authentication mechanism, while the legacy server remains unchanged. Authentication translator 136 works similarly, but it provides authentication translation as a third party service to multiple providers, an example of which is online camera retailer 124.

Authentication translators 134 and 136 can also perform process 500. For example, when a device transmits a request to access website 122, the request is intercepted by translator 134, as is cookie/user agent information. The received information can be used to determine a username/password associated with the device, and that information can be passed by translator 134 to website 122 on behalf of the device.

Figure 6:
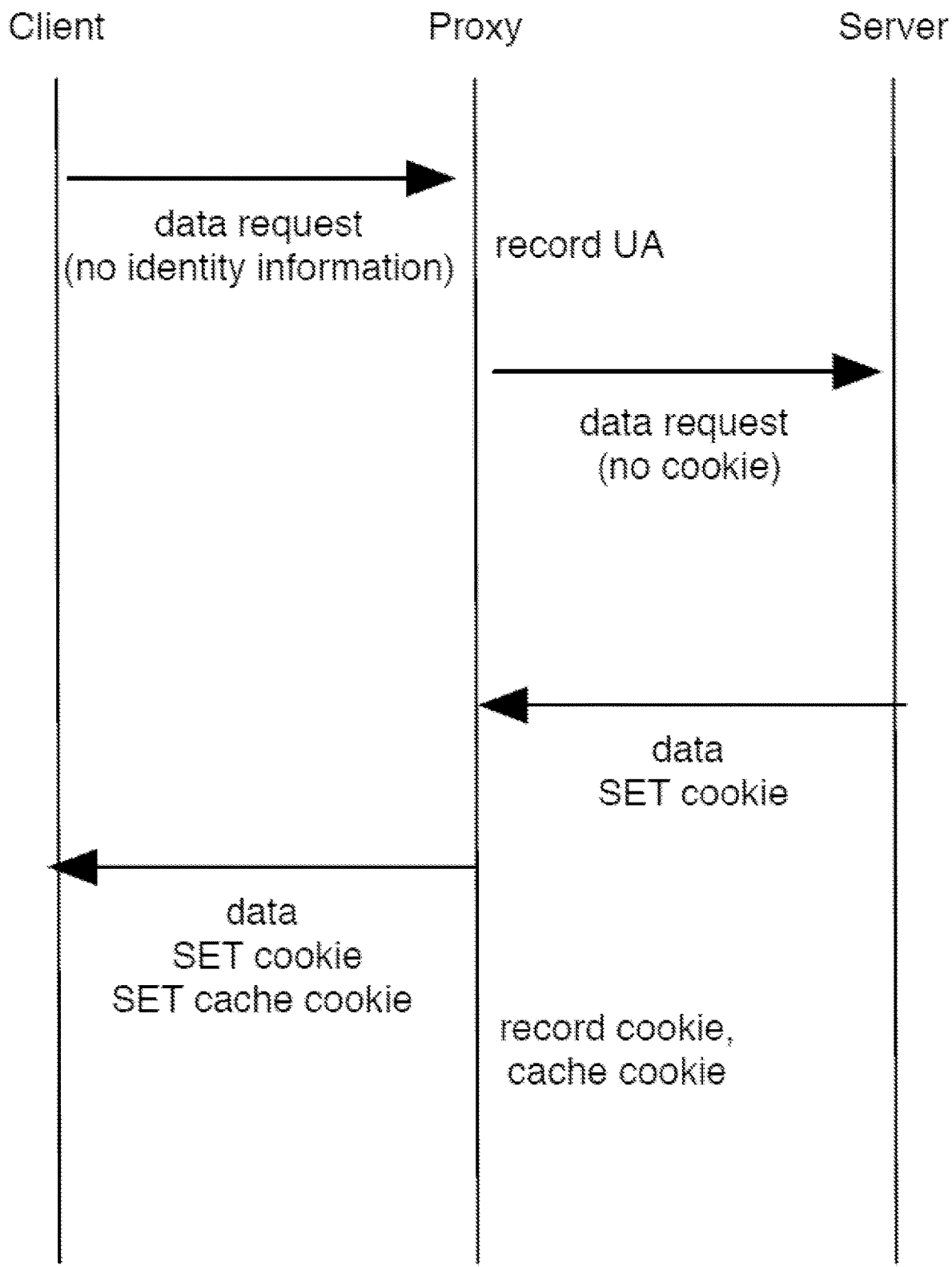
FIG. 6 illustrates an example of what occurs when a client device first visits the site of a legacy server via an authentication translator.

FIG. 6 illustrates an example of what occurs when a client device first visits the site of a legacy server via an authentication translator. The translator (referred to in the figure as a "proxy") fails to identify the client, and passes on the request to the legacy server. The legacy server responds to the request and sets a cookie. The proxy passes on the response, including the cookie and also a cache cookie. The proxy stores the information about both these types of identifiers, along with the user agent of the client device. This triplet of information is also referred to herein as an identifier.

Figure 7:
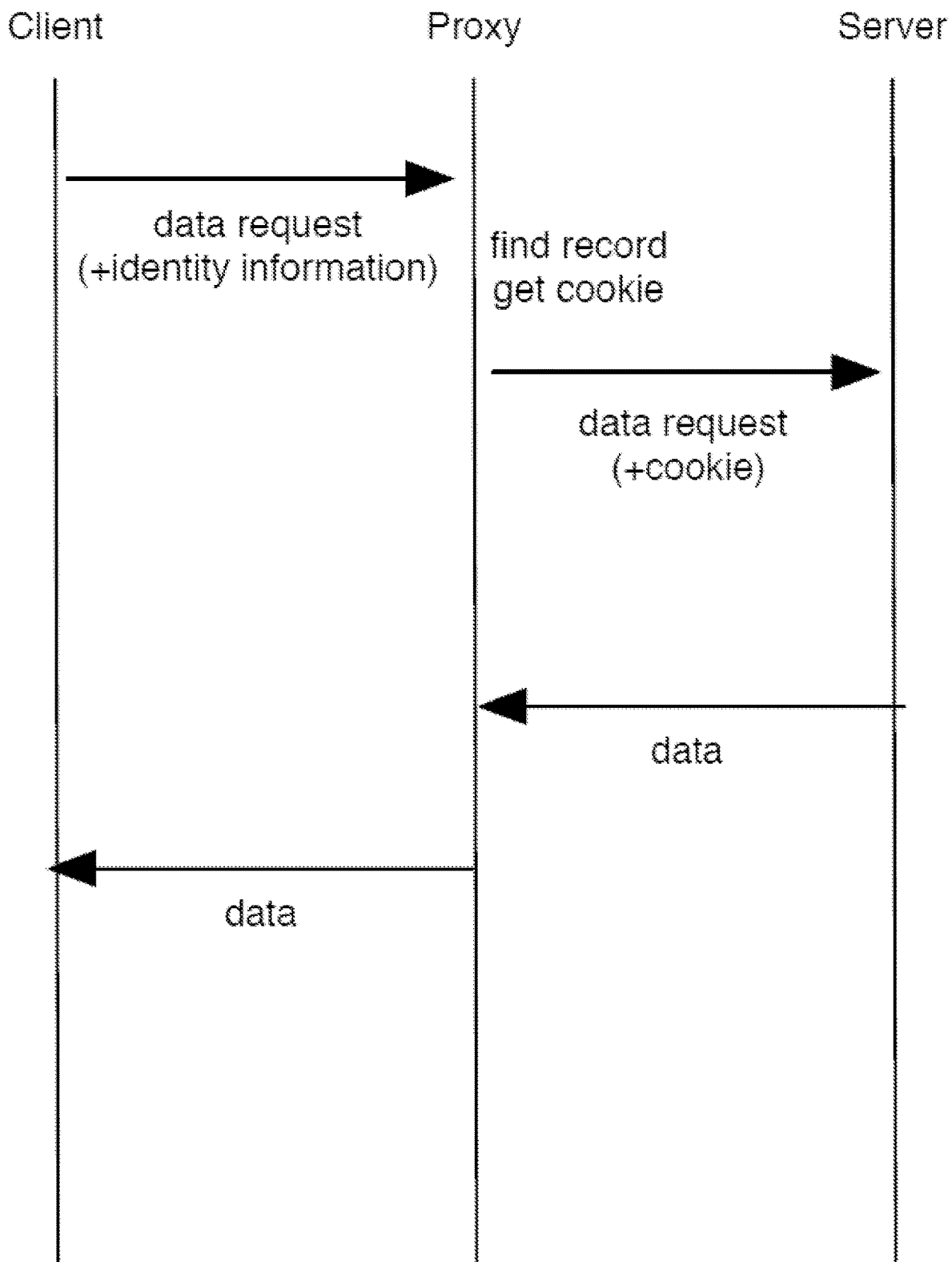
FIG. 7 illustrates an example of what occurs when a device subsequently visits the site of a legacy server via an authentication translator.

FIG. 7 illustrates an example of what occurs when a device subsequently visits the site of a legacy server via an authentication translator. In this scenario, the device's request is accompanied by some form of identifying information. The proxy uses this information to identify the associated cookie and passes this along to the legacy server, along with the request. In some embodiments, additional processing is also involved. For example, reading a cache cookie may require user interaction. Moreover, if not all of the identifying information is present in the request, the proxy can be configured to set the missing information again by sending a corresponding request to the client device.

The translation of cache cookies and user agent information to cookies involves a two-way translation. First, when the legacy server sets a cookie, the proxy will set the two types of cookies—both an HTML cookie and a cache cookie—and then create a new record in which the two cookies are stored, along with the user agent information of the client device. The user agent information can include quite a bit of data associated with a browser—such as the browser type and version, the clock skew, and the fonts that are installed. While each of these pieces of information only contributes a small amount of entropy, the collection of items can be sufficient to identify the device in most cases. Moreover, while some of these types of data may change over time—in fact, all of them may—they do not typically change, and when one or two of them do, the others typically do not. When the client device is used to visit a site controlled by the legacy server, the cookie, cache cookie and user agent information are read (if available), the record identified, and the request translated and sent to the legacy server. When a legacy server requests that the user password is updated (e.g., as part of an annual or other periodic requirement), the transmission of this request to the user can be suppressed—in which case the database of the proxy is updated to create the illusion of an update. The user can be involved in authentication as needed, e.g., if, in addition to supplying a credential, a user must also solve a CAPTCHA, the CAPTCHA can be displayed to the user (with the user's credentials being handled in accordance with the techniques described herein).

Figure 8:
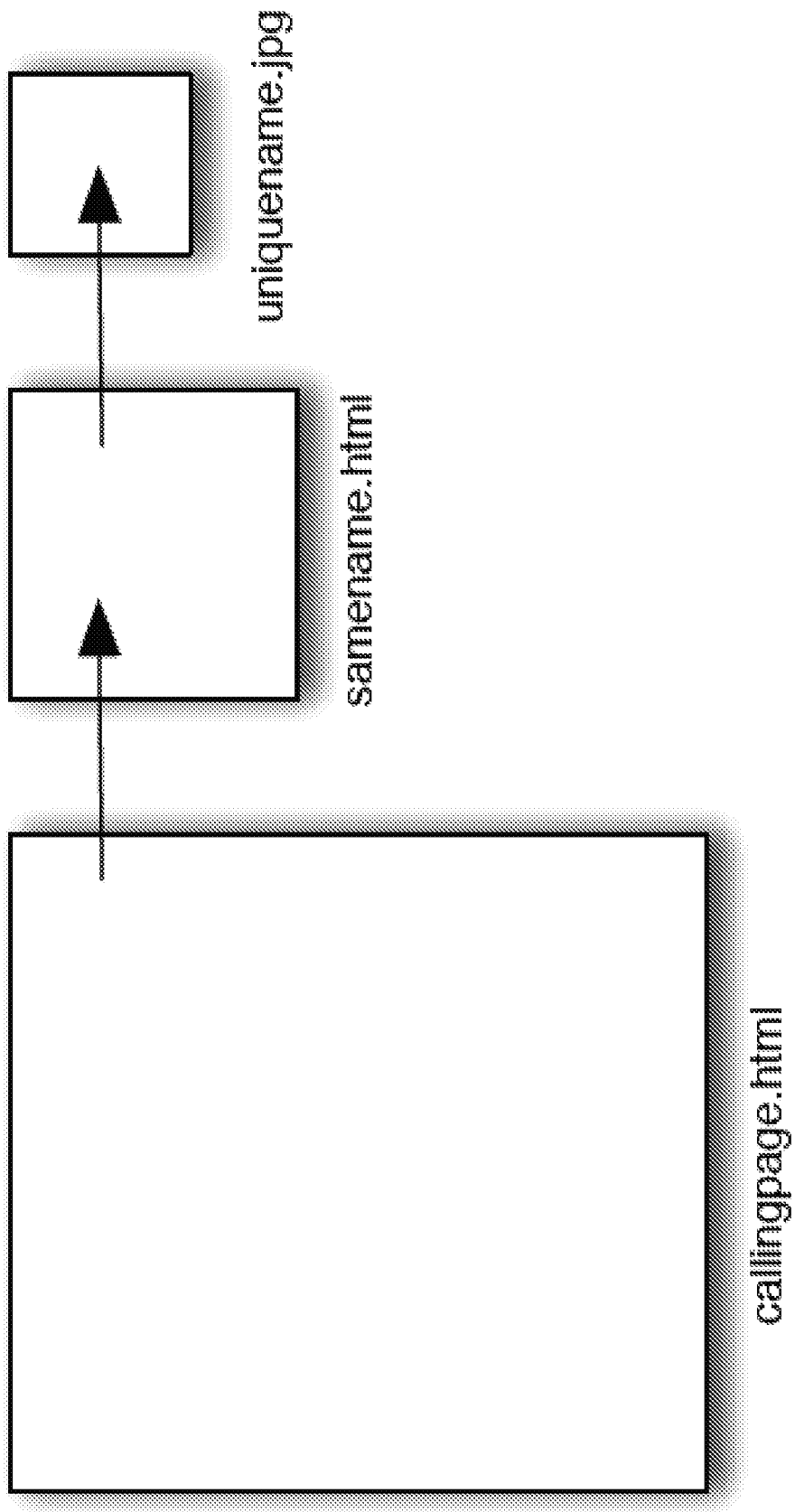
FIG. 8 shows the structure of an example of a cache cookie used in some embodiments.

FIG. 8 shows the structure of an example of a cache cookie used in some embodiments. Cache cookies can be associated with a particular webpage, just like an HTML cookie can. In the example shown in FIG. 8, the proxy wishes to associate a page "calling page.html" with a cache cookie. It embeds a request for a second object, "samename.html" in callingpage.html for every visitor. However, as the cache cookie is set for one visitor, a customized samename.html is served to this visitor. The page samename.html refers to an object with a different name for each user; that object is referred to as "uniquename.jpg." The cache cookie is set by embedding the request for samename.html in callingpage.html. The client browser attempts to render this, causing a request for samename.html from the server. The server configures samename.html to refer to a uniquely named file uniquename.jpg, and serves samename.html to the client. For the client browser to render samename.html, it requests the file uniquename.jpg, which is intentionally not served. That concludes the setting of a cache cookie. As a user returns to the page callingname.html, the browser again attempts to render the entire page, which causes it to load the object samename.html from its cache. As that is rendered, the client browser requests uniquename.jpg, which is not in its cache (since it was not served previously). The server still does not serve it, but takes note of the name of the file being requested, as it identifies the client device. Note that samename.html can be displayed in a zero-sized iframe, which makes the end user unaware of it being rendered.

A cache cookie is an implementation of the typical cookie functionality that uses the client device's browser cache. Unlike user agents, it does not change over time, and like standard HTML cookies, it cannot be read by a party other than that which set it. However, like HTML cookies, it could be deleted—by the user clearing his or her browser cache. Cache cookies are not automatically transmitted with GET requests, unless the cache elements are embedded in the referring pages. This adds a potential round of communication in some settings. By relying on user agent information, cache cookies, and HTML cookies to identify the client device, it is much more likely that a machine will be recognized than if only HTML cookies are used.

Additional Embodiments

A user-created vault may contain, for example, one or more credentials, such as cryptographic keys, passwords or cookies. Such credentials may be used to authenticate a user or a device to an external entity, such as a service provider. Keys can also be used to enable access to data that is encrypted. The contents of the vault may be very sensitive, and in some cases are therefore protected against unwanted access. The leak of a key, for example, could enable an attacker to impersonate a user or a device, or to access privileged data that the attacker does not have the right to access. Therefore, in some cases, the contents of vaults should be protected against any exposure.

A user may become unable to use a vault, for example, if they lose the device that stores the vault. This will hinder the user to perform tasks such as job duties, and may also cause problems to the user's personal life. For example, a key stored in the vault may be used to access a job-related resource, such as a human resource database. Resources can also be of a physical nature. For example, the job-related resource that the key in the vault grants access to may be an office building, where the key is used to open a door or enable a turnstile. Similarly, personal resources may also relate to access to data or computational services, or to physical objects or boundaries.

In some embodiments, to avoid problems associated with becoming unable to access a vault, backup of vaults, in full or in part, is performed. A user has several options. One example option is to back up vaults to a cloud database or other centralized database. This may be made available to the user from, for example, their employer, or directly to the user based on a subscription or membership basis. To gain access to the cloud database or other resource, the user may for example use one out of several enrolled devices, such as phones, wearable computers, laptop computers, or other types of devices with processors. Such user devices are collectively referred to as "processing devices"; for illustrative purposes, individual instances of such processing devices will also be referred to in the examples and embodiments described herein.

For illustrative purposes, examples involving processing devices having a user input capability are described. In various embodiments, the user input capability is in the form of a keyboard, a touch screen, a camera, a fingerprint sensor, a microphone, or another sensor usable to collect input information, where in some embodiments this input information is usable to identify the user. For example, a keyboard can be used to input a user name and password. The keyboard may also be used to determine typing patterns that can be used to identify a user. Similarly, a camera can be used to scan QR codes, which can be used for authentication purposes in lieu of passwords; the camera can also be used to take photos of the user's face, which can be used for purposes of identification.

The exemplary processing devices described herein also have a communication capability in various embodiments. Examples of such communication capabilities include but are not limited to wireless communications, such as BLUETOOTH®; standardized interfaces, such as USB interfaces; audio communication entities, such as microphones and speakers.

In some embodiments, the processing devices include a user-facing output capability, such as a screen, a light (such as an LED), a speaker, etc., that is used to convey information to a user. In other embodiments, the processing device does not have a user-facing output capability, but instead communicates with an external entity, such as an associated computer with a user-facing output capability, where a user-facing output is rendered or otherwise conveyed. In some embodiments, the user-facing output capability is used to convey information to the user, such that the processing device is operating; that the processing device is requesting a user input; that the processing device is in a requested operating state, etc.

Two processing devices can communicate with each other, whether directly or by using other devices as intermediaries. One example type of intermediary is a cloud storage entity, which can be used to convey information from one processing device to another processing device. One example type of information that may be conveyed from one processing device to another processing device is a vault. In some embodiments, the information conveyed further includes information usable to access the vault, identify the type or ownership of the vault, and more. In some embodiments, a user backs up vault information from a first device to a second device by causing vault information to be conveyed directly from the first device to the second device, or by using the cloud storage entity or other centralized database as an intermediary that stores the vault sent by the first device, and later sends the vault to the second device. In some embodiments, the vault protects its contents from being illegitimately accessed by using encryption. For example, the first device creates the vault by encrypting credentials to be placed in the vault using an encryption key and associated encryption algorithms. For any other device to later access the vault, it would need the corresponding decryption key and decryption algorithms. Example encryption and decryption approaches include, but are not limited to, RSA encryption, ElGamal encryption, AES encryption, and more. Some implementations may use elliptic curve methods to enable a high degree of computational efficiency.

There are various ways of securely conveying vaults or vault contents from one computational device to another. In one example case involving an intermediary such as a cloud storage or other centralized database, the vault is stored centrally, (potentially or optionally) updated, and then redistributed to one or more computational devices. These devices need to be enabled to access the contents of the vault, which in some embodiments is facilitated by obtaining a key from an originating computational device; from the cloud storage or other centralized device; from third party trusted parties; from a user operating a computational device with access to the vault contents; or a combination of these. For example, when a vault is conveyed from a first computational device to a cloud storage, and then to a second computational device, the cloud storage may play the role of initiating the second computational device, where the initiation includes the delivery of a key usable to open the vault. In some embodiments, the cloud storage entity uses a policy to determine what second computational devices are allowed to be initiated and obtains a key usable to access the content of a vault. For example, this may be limited to computational devices that have a sufficient security level associated with them. The policy may be set by a user of the first computational device, an employer of such a person, or can be a system-wide policy, or a combination of such policies. For example, a user may set a policy that states that only computational devices that are associated with a given Internet Protocol (IP) range when requesting a vault from the cloud storage may be approved. This may, for example, be an IP address from which the first computational device has previously been observed. In addition, the employer of the user may have a policy stating that only devices that are on the employer's approved list of devices may be used, where in various embodiments this approved list includes types or brands of devices, Media Access Control (MAC) address ranges, etc. Furthermore, in some embodiments, the system has a policy that states the minimum security level for allowing transfer of vaults, where in some embodiments, this policy is updated over time to account for new knowledge relating to security incidents. In some embodiments, a computational device is only enabled or allowed to access the contents of a vault it receives (e.g., from a cloud server) if it satisfies all of these policies associated with the vault. That is, the policies control the access and synchronization of data, such as the data stored in the vaults.

As another example, a first computational device with the capability to access the contents of a vault communicates a key to an approved second computational device after having performed a pairing with the second computational device. In various embodiments, the pairing comprises a verification of information describing the security level of the second computational device; the establishment of a secure channel; a distance-bounding process; a verification of user approval, or other security processes. An example of a verification of information describing a security level is the receipt of packets from the second computational device, the packets having headers, and the contents of the packets having a certificate related to a public key and a digital signature using a signing key associated with the public key in the certificate, the digital signature being associated with a message or a time stamp, where in some embodiments, the message is one or more packets or their contents, where these packets were received by the second computational device from the first computational device, and where in some embodiments, the contents include nonces, time indicators, and information related to the vault. In some embodiments, the time stamp is a value received from a third party, such as a trusted time keeper. In other embodiments, it is also the system clock of one of the two devices involved in the pairing, or a combination of such values, where in some embodiments the time values are exchanged in other packets exchanged between the first and the second computational devices. The certificate may be issued by a trusted third party such as a device manufacturer, an employer, or another party trusted by the user of the first computational device or the second computational device. Another example pairing method is the pairing method used to pair two BLUETOOTH® enabled devices, such as distance-bounding protocols. In some embodiments, verification of a user approval involves the display of a code on one of the computational devices, and the entry by a user of this code into the other computational device involved in the pairing. When one or both of the computational devices do not have a keyboard or a screen, an external keyboard and an external screen may be used (e.g., by the computational device being connected to a trusted device that has a keyboard and/or a screen). Two computational devices may also be paired using a line-of-sight approach. One example of such an approach is one in which one of the computational devices displays a code such as a QR code or barcode, etc., encoding a pairing message (i.e., data in place of one or more packets as described above), and the other computational device is used to photograph the QR code or barcode. Another example uses a device-to-device communication method such as infrared (IR), or short range radio signals such as BLUETOOTH®. Alternative example pairing approaches include moving the two computational devices in unison, e.g., putting them on top of each other and shaking them. The coordinated movement may be detected using accelerometers, for example, where each device generates a value based on the detected time-series of acceleration measurements and uses the value to determine that the devices are moved together. This can be performed, for example, using a socialist-millionaires algorithm, where a comparison is performed to determine whether two values are identical without disclosing any other information about the values.

In one embodiment, after pairing has completed, or as part of the pairing process, key establishment takes place. In various embodiments, the key establishment uses key transport such as an RSA-based approach, or key exchange, such as a Diffie-Hellman based approach. In some embodiments, the key exchange is also performed as part of the socialist millionaires' process, where a tentative key and a pairing value held by one of the two computational devices is compared to the tentative key and pairing value held by the other of the two computational devices, the associated combinations of values being compared by the two entities. If the comparison completes with a match being determined, the tentative key is used to establish a secure channel. In some embodiments, the key establishment is also, whether in part or in full, performed by a user entering a code from one of the devices into the other device.

In some embodiments, a vault is associated with one or more policies, which tie what actions are allowed to be performed using the data in the vault, where in various embodiments, such data includes credentials such as cryptographic keys, passwords, cookies, etc. For example, one policy may state that the vault may be stored on a shared device, but only for purposes of backup, and that it may not be used for purposes of authentication from that device. Therefore, to use the vault, a user would have to utilize the backup of such a vault to initialize a new computational device and transfer the vault to this device, after which its content may be used for purposes of authentication. Another example policy may state that the vault may be used for purposes of authentication on any computational device with a security level that exceeds a policy-mandated minimum. Thus, in this example, the security level may be expressed as a numeric value and the policy-mandated minimum as a threshold to compare the numeric value to. In some embodiments, the security level is determined by the hardware of the computational device (e.g., where a secure processor is utilized for accessing the vault). As another example, it is determined based on software (e.g., that the computational device is configured to auto-update software and download anti-virus definitions automatically). As another example, it is based on an action, such as having just been screened using a software-based attestation technique.

In one embodiment, a user needs to register on a computational device before a vault is transferred to the computational device. For example, as a user starts a new computational device, they are required to register. Similarly, a user wishing to use a friend's or colleague's computational device to store their vault would register on that computational device. In some embodiments, registration includes creating a record, at least part of which is either encrypted or stored in a secure storage. On example of secure storage is a storage that is only accessible using a restricted API, which is only available to selected processes. Another example of secure storage is a storage that is at least in part encrypted and/or authenticated. Yet another example of secure storage is a storage that is only accessible by one or more dedicated processors, such as a processor that evaluates biometric data against stored templates. In some embodiments, registration also includes data usable to authenticate one or more users associated with the registration. In some embodiments, the owner or user of the computational device on which the registration record is stored authenticates to the device and then indicates that they want to add a second user on the device. This second user would then be prompted to enroll, and the computational device stores the associated profile. This is therefore distinct from the owner of the device adding another fingerprint or other biometric verification technique to an existing profile of theirs, as the second user is associated with a new and different profile, but a new fingerprint or other biometric verification technique of an already existing profile may be added to the same profile. In some embodiments, two different profiles have different policies associated with them, where example policies address the keys that would be associated with a user after a successful authentication to the computational device. In some embodiments, the matching of a profile is determined at least in part by the verification of authentication data such as at least one of a password, a PIN (personal identification number), biometric data, knowledge-based authentication, second factor authentication data, or other authentication data. The registration may have already been performed in the past, prior to the initiation of the vault transfer. For example, a user may already have access to the device to which a vault is to be transferred. In some embodiments, a profile is matched if an authentication attempt that includes one or more such authentication methods succeeds. Some profiles may require multiple associated users to successfully authenticate for the profile to be matched (e.g., at least three out of five). In some embodiments, based on what profile is matched, one or more records are selected. These records are associated with vaults. This selection of records and vaults in turn decides what privileges and access rights the user has when accessing services and data. These privileges and access rights may depend on policies associated with the record, the type of authentication method was used, and a score associated with the authentication. In some embodiments, the profile that is associated with a user is tied to one or more vaults, where such vaults may be associated with different policies (e.g., in terms of whether the vaults can be used for authentication on the computational device or only be used as a backup). In some embodiments, the policies also state what actions are to be taken by the system if there is a failure, such as a failure to authenticate. One example of such a policy requires that a vault is erased after a set number of failed attempts, such as ten attempts, or that a vault that initially was allowed to be used for authentication according to a policy associated with it is modified to only be used for backup purposes after a risk indication is observed, such as more than a threshold number of failed attempts within a selected time period, such as at least ten attempts within one day.

Figure 9:
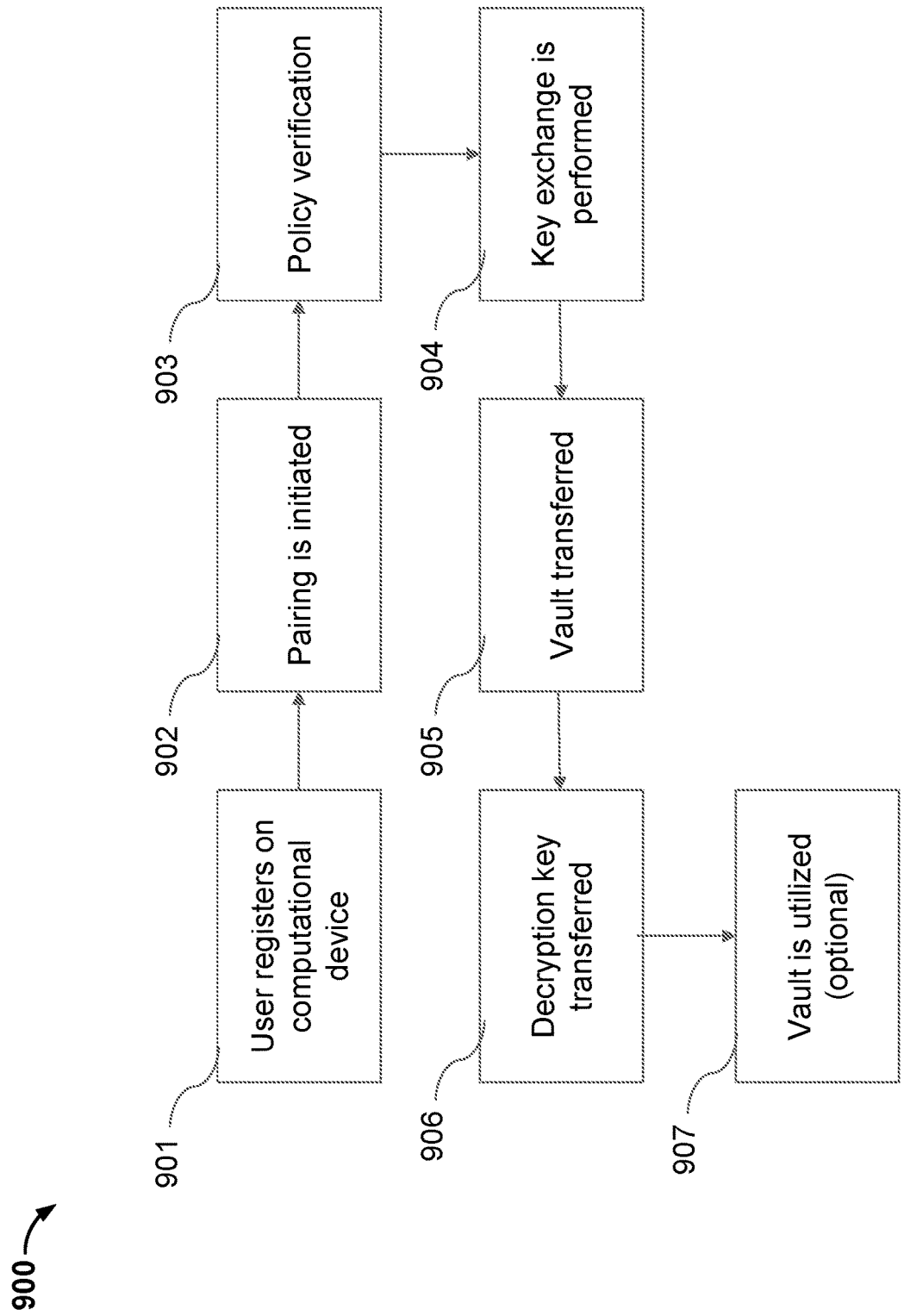
FIG. 9 is a flow diagram illustrating an embodiment of a backup process.

FIG. 9 is a flow diagram illustrating an embodiment of a backup process. In this example, process 900 includes an example series of events associated with a backup process. The process begins at 901, when a user accesses a computational device. This may be the user's computational device, or it may belong to another user, in which case the user registering in step 901 is registering, for example, as a second user on the computational device. In this example, the registration process involves one or more prompts instructing the user what actions to take, where example actions include the creation of a biometric template (e.g., related to one or more of fingerprint features, voice biometric features, facial recognition features, or iris detection features). The template is part of the user profile created for the user. The profile also includes policies related to access to resources, policies related to vaults, as well as one or more vaults, which may be generated locally or obtained from an external source such as another computational device or a cloud storage entity. At 902, pairing is initiated between the computational device and an external resource that stores a vault to be synchronized (e.g., transferred to the computational device on which the user registered in step 901). Examples of external resources include another computational device, a cloud storage resource, etc. As part of the pairing between the computational device and the external resource storing the vault, the computational device sends information relating to its security level, which in various embodiments includes a certificate or another type of assurance from a party trusted by the external resource. At 903, the external resource determines that the requested vault is allowed to be transmitted to the computational device. If it is, pairing is completed. In some embodiments, the pairing requires the user to perform one or more actions, such as authenticating to one or more of the computational devices and the external resource. At 904, key exchange is performed, and a secure channel is established. At 905, the vault is transferred, for example over a secure channel, from the external resource to the computational device, and associated with the profile created by the user. At 906, the decryption key for the vault is transferred from the external resource to the computational device (e.g., over the secure channel or by the user obtaining and copying a code into the computational device). With the decryption key, the vault can be opened. In some embodiments, the vault is obtained without full security verification, but the decryption key can only be received after pairing, policy verification, and key exchange are performed. At 907, the vault is utilized by the user for authentication to a resource, or to create a new backup on yet another computational device, using a similar process. In some embodiments, the steps described in FIG. 9 are performed in another order (e.g., performing policy verification after the key exchange is performed). Also, in some embodiments, some of the steps, such as pairing, are not performed, or some of its functionality is performed as part of another step, such as the key exchange step.

One example of synchronization is to copy new data from a first computational device to a second computational device, where the first and second computational devices have been associated with each other. If one or both of the computational devices include multiple profiles, then the synchronization is performed relative to the associated profiles. For example, if Alice has a profile on computational device A, and both Alice and Bob have profiles stored on computational device B, then an update of Alice's profile on computational device A causes data to be synchronized to the associated profile associated with Alice on computational device B, but not to the profile associated with Bob on computational device B. The two profiles may be stored in the same storage unit, or in two different secure storage units. Each profile may correspond to one or more records, which may be stored in different storage units. In some embodiments, at least one portion is stored in a secure storage. In one embodiment and for some devices, all storage may be considered secure; this assessment can be based on what types of processes are allowed to execute on the device. For example, if only trusted processes are allowed to run on the device, all storage may be considered trusted, based on a security evaluation being performed to confirm that only trusted processes are present. In some embodiments, this security evaluation involves performing remote attestation. Once two devices have established a secure channel, the secure channel can be reused for such synchronization, whether the encrypted synchronization data is sent directly from device A to device B (e.g., using a direct wireless connection) or whether it uses one or more intermediaries, such as a communication network involving a cloud storage entity as one party to the communication, or a communication network such as the telephony network or the Internet. One example approach, for example, is for one computational device to advertise the existence of synchronization data to one or more other computational devices, using a notification system that may involve an untrusted third party that simply is in charge of conveying notifications; a device receiving such a notification can respond to it, whether to request the synchronization to take place or not, and then, if a synchronization was requested, to receive the synchronization data over a secure channel. Here, the secure channel provides encryption of the contents, as well as a conditional authentication of the contents. As one example, the encryption is performed using a first key and an algorithm such as AES, and the authentication performed using a second key and an algorithm such as SHA-MAC, which is an example of a keyed hash function. The first and the second key are derived from a shared key that has previously been established between the devices. Alternatively, the devices have stored each other's public key and perform key transport for a master key from which the two keys used for encryption and authentication of the synchronization data is performed. Example contents on the synchronization data include, but are not limited to, new policies, new credentials such as keys used to interact with service providers, new keys to be distributed to address revocation of previously delivered keys, new biometric data, new user information associated with profiles, and more.

Another example of performing synchronization involves the transmission of a certificate signed by one of the computational devices involved in the synchronization data to be transmitted, where, in some embodiments, the certificate associates a capability or right with a public key associated with a user profile, or with a user profile associated with a specified computational device on which the user profile is stored. In some embodiments, a certificate also describes the security context of the receiving device, or requirements relating to this. In some embodiments, certificates are exchanged in one or both directions of the exchange corresponding to the synchronization, where the certificate from the originator of the vault is associated with stated requirements on the receiving device while the certificate transmitted by the receiving device is associated with the security context of the receiving device. The receiving computational device associates a received certificate and associated policies with the indicated profile after verifying that they are valid (e.g., by verifying the digital signature of the certificate). To later authenticate on behalf of the user, the receiving computational device sends a digital signature associated with the certified public key, and where the digital signature is generated on an input message that relates to a description of the requested action, along with the received certificate. This enables the recipient of the associated request, which for example is a service provider, to verify the validity of the request relative to the signer, where in some embodiments, the signer is a computational device or a component thereof, and relative to the computational device that originated the synchronization data including the certificate. It provides additional granularity relative to a system in which the same key is used on multiple devices, which in turn enables device-specific revocation, should a device be suspected of having been compromised. An alternative to this approach is the automated generation of a new key by a computational device whose capabilities are not being revoked, where this new key is signed using the old key, thereby invalidating the old key, no matter what device uses it, in favor of the new key. In some embodiments, this also requires the synchronization of the new key to each computational device whose capabilities are not being revoked relative to the now-replaced key. Here, signing using a key is an action performed using the secret key of a secret key-public key pair that is newly created, and that the data that is signed includes the public key to be revoked, where revoking this means that the associated secret key of the revoked public key no longer can be used to sign messages. Other techniques of synchronizing authentication data, whether to add or replace policies, keys and other data, or to perform revocation, may be used instead, as appropriate.

In some embodiments. secure storage can only be accessed using a restricted interface. One example of such a restricted interface is a dedicated physical connection from a processor permitted to access the secure storage. For example, this may be a bus; alternatively, the secure storage may be integrated with the processor allowed to access it (e.g., the storage includes non-volatile registers of the processor, or an alternative type of memory that can be accessed from the permitted processor). The secure storage and the processor permitted to access it may also be integrated on a SoC (System on a Chip). Alternatively, the restricted interface may be an API (Application Programming Interface) that is only accessible from a secure mode of operation of a processor. In one embodiment, access to the API is only granted from selected processes or applications; in another embodiment, the API is only accessible using a secure operating mode of the processor.

The processing device, in some embodiments, includes a hardware-based cryptographic accelerator, such as a special-purpose processor with hardware support for cryptographic operations. Alternatively, a processor of the processing device may have micro-instructions dedicated to cryptographic operations, such as computing cryptographic hash functions, computing or verifying digital signatures, encrypting or decrypting data, or computing other one-way functions efficiently. An example cryptographic hash function is SHA-256. Example algorithms for encryption and decryption are AES, RSA and ElGamal. Example digital signature algorithms are RSA and DSA, which also include or use the computation of a cryptographic hash function. Digital signatures can also be generated using Merkle signatures or Lamport signatures, both of which are based on a one-way function. SHA-256 is a believed one-way function. In some embodiments, a processing device has both hardware support for cryptographic operations and dedicated micro-instructions for cryptographic operations.

In some embodiments, a policy associated with a vault determines whether a vault may be backed up. In some embodiments, the policy depends on externally available information, such as the contents of a registry maintained by a trusted third party, the contents of the registry indicating how many backups have been made of the vault; how many of these backups are known to still exist; and whether there is a need to revoke the rights of any computational devices holding backups of the vault, resulting in the vault being erased from such computational devices. In some embodiments, this policy is also used to determine whether contents of a vault need to be revoked (e.g., by placing a public key associated with the vault on a revocation list); whether the contents of a vault need to be updated (e.g., by replacing one key with another). Policies can also be associated with devices, or with all vaults on a device. Such a policy may state that vaults can only be backed up to computational devices of the same brand, or to computational devices that satisfy software requirements associated with the policy, such as having anti-virus software or using an operating system that is the most recent version or the version before that, but not older. Policies may be associated with individual vaults, or with selected contents of a vault, such as a key that is used for a purpose identified in the policy. In some embodiments, authentication information such as biometric data is not included in the data that is synchronized during a backup, whereas in other embodiments biometric data is included unless a policy associated with the vault prohibits it.

In one embodiment, as vaults are backed up, they are not copied verbatim to the backup device. Instead, some of the contents are modified as a backup is performed, whether of the copy of the vault that is transmitted to the other device or to the copy of the vault that is kept. For example, the system may update policies associated with a vault (e.g., to indicate whether a vault contains a master key or a derived key), where the derived key may be associated with lesser capabilities. As another example, the original copy of a vault includes a first secret key and associated first public key, but the derived copy of the vault includes a second secret key and associated second public key, along with a digital signature on the second public key using the first secret key, where this digital signature is verified using the first public key. Such an approach simplifies revocation, as selected keys can be revoked. In addition, this allows revocation of any key that was digitally signed using an already revoked key, which may be performed, for example, if there is a breach. In some embodiments, a backup is split into two parts, each part which is backed up to a separate device, and where both parts are required to be synchronized to one and the same device, which can be yet another device, in order for the backup data to be accessible. In some embodiments, a backup is split up into three or more parts, and in a manner that requires a quorum of backup components to be combined for the data to be reconstituted. In some embodiments, public key secret sharing techniques are used to facilitate such functionality. Techniques based on symmetric key technology may also be used.

Figure 10:
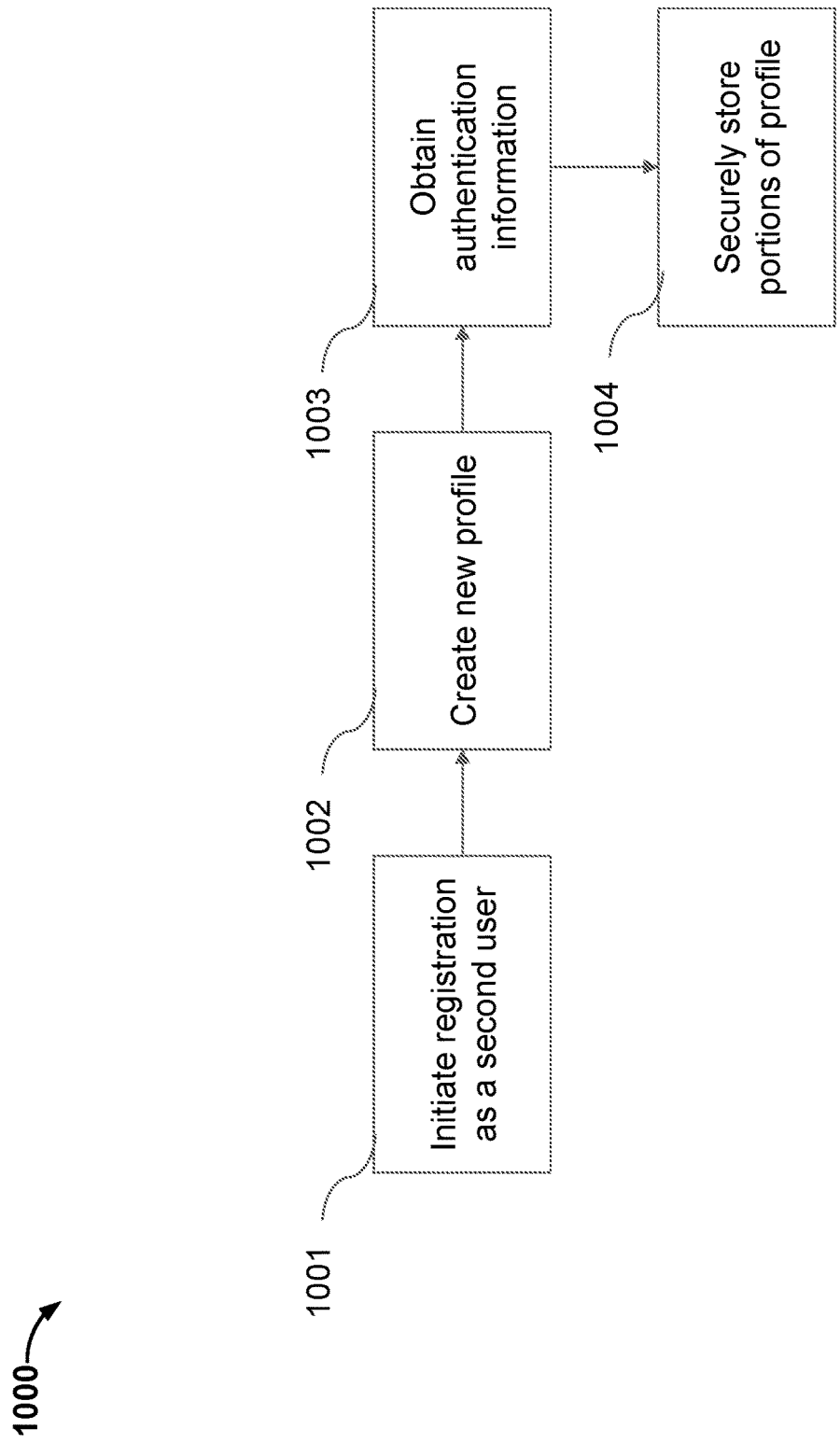
FIG. 10 is a flow diagram illustrating an embodiment of a process of a user registering as a second user on a computational device.

FIG. 10 is a flow diagram illustrating an embodiment of a process of a user registering as a second user on a computational device. In some embodiments, process 1000 is executed by a computational device. The process begins at 1001, when the registration process is initiated, for example, by the main user of the computational device making a request to add a new user as a second user. At 1002, a new profile is created for the second user. As one example, the profile has at least one database record, to which one or more profiles may be added, whether by the new user or during the synchronization of one or more vaults, such as described in the example of FIG. 9, where policies may be associated with the one or more vaults. Additional policies may be obtained from third parties, such as an employer. A user may indicate the source of such policies during the registration at 1001, or the source may be indicated by vault data transferred to the device, such as at step 905 of FIG. 9. Alternatively, in some embodiments, the source is communicated along with policies, which may be received, for example, as part of the pairing process 902 described in conjunction with FIG. 9. At 1003, the computational device receives authentication information, such as cryptographic keys, passwords or other credentials. These are added to the profile as part of one or more vaults associated with the profile. At least portions of the profile are stored securely at 1004; examples of such secure storing include storing the profile in a secure storage such as a storage that can only be accessed by a dedicated processor; and encrypted and authenticated and stored in an insecure storage, while storing the keys to decrypt and verify such data in a secure storage that can only be accessed by the dedicated processor. Another example of such secure storage includes storing the profile in a storage that can only be accessed using a restricted API. In some embodiments, this restricted API is only accessible by some processes or from some processing environments. In yet another example, the profile is encrypted and authenticated using one or more keys that are only accessible using a restricted API from a whitelisted process or from a selected processing environment; and where the encrypted and authenticated profile can be stored in another type of storage, including a storage that is not secure. Multiple users may be added as second users on a device. In some embodiments, for each one of these multiple users, a separate profile is generated and stored. In some instances, multiple users may share access to a resource. In these instances, their authentication information may be stored in one and the same profile (i.e., the same profile for all the multiple users with access to the resource); they may also be stored in independent profiles, where each profile indicates the resource to which an associated user has access. The access information may include multiple resources. This information may be stored in the profile or in one or more associated records. The access information, in one embodiment, is stored securely (e.g., on a storage unit that can only be accessed by a dedicated processor, only be accessed using a restricted API, or only accessed from a computational environment that has been determined to be safe).

Figure 11:
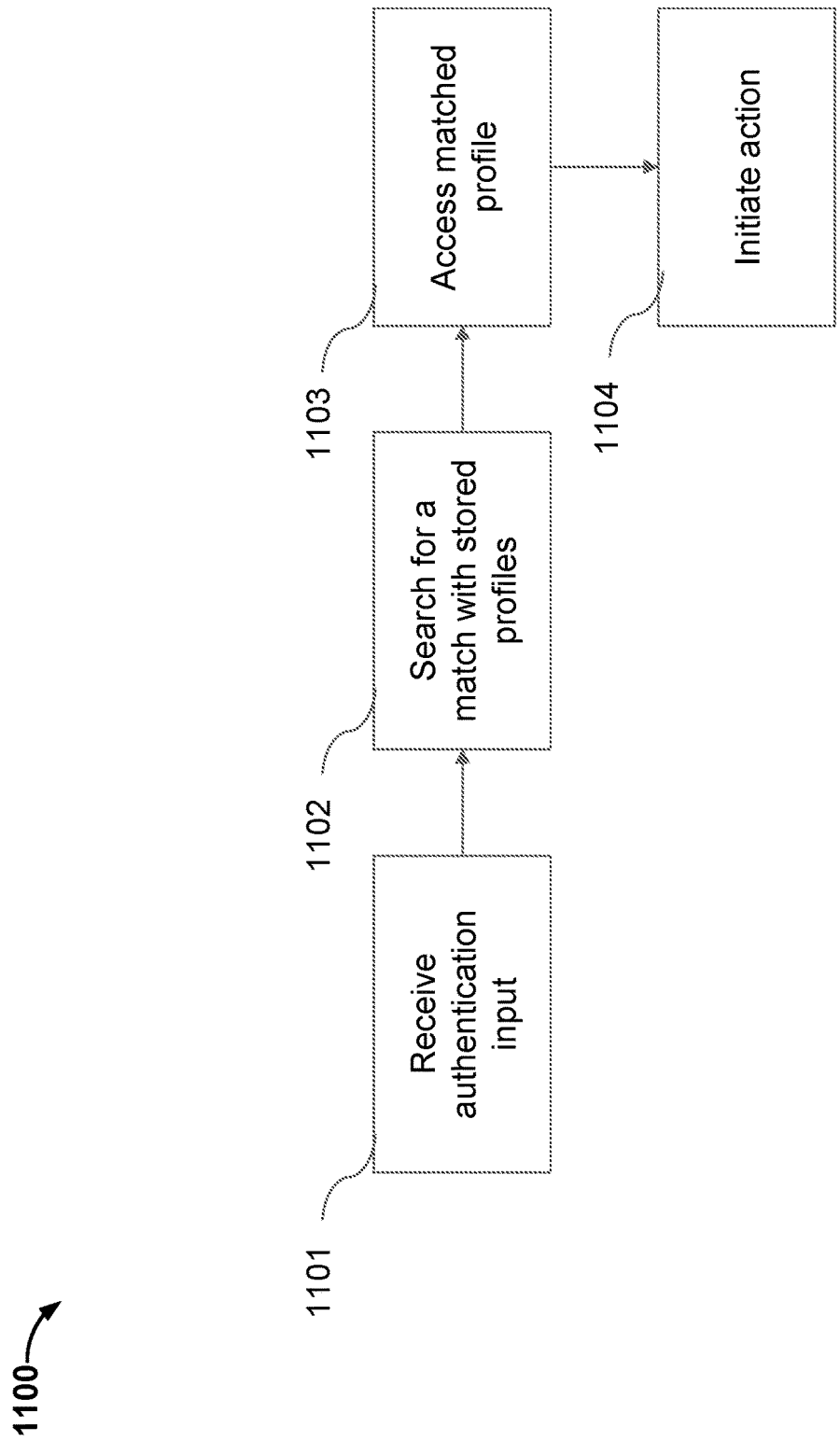
FIG. 11 is a flow diagram illustrating an embodiment of a process an authentication attempt on a computational device.

FIG. 11 is a flow diagram illustrating an embodiment of a process of an authentication attempt on a computational device. In some embodiments, process 1100 is executed by a computational device. The process begins at 1101, when the computational device receives a user input, such as a fingerprint, iris biometric information, face biometric information, or another input with the capability to authenticate the user, including other biometric information and/or a password, PIN or knowledge-based authentication string. Such user input is referred to herein as authentication input. At 1102, the computational device accesses one or more stored profiles to determine whether any one of these matches the authentication input. If a profile is securely stored in an insecure storage (e.g., authenticated and encrypted, making the insecure storage a secure storage with respect to the encrypted and authenticated element), then it is loaded into secure storage, decrypted, and verified with respect to its authenticity. If a profile is already stored in secure storage, such as a storage only accessible from a dedicated processor or only accessible using a restricted API, then this may not be necessary, but is still performed in some embodiments as additional assurance. For example, in some embodiments, this is required for a computational device to be certified to high security levels. A match is performed by comparing the one or more templates associated with the profile, and determining whether the match is sufficiently good (e.g., by determining that a matching score exceeds a threshold value, such as a value 0.82—this is but one example of a threshold value, and other threshold values maybe used). Another biometric template may have a higher threshold value associated with it (e.g., a value 0.92). In this example, this corresponds to a better quality match. In some embodiments, policies associated with vaults specify the threshold at which a match needs to be performed for an action to be permitted, where different types of actions may be associated with different thresholds. As a match is found, the associated profile is accessed, as shown at 1103. In this example, when the profile is accessed, the computational device extracts or loads the associated vault, or portions thereof. In some cases, the vault may already have been loaded, as part of the loading of the profile, or it may be loaded in response to the match being made. In some embodiments, as a vault is loaded, it is decrypted and, in some embodiments, its authentication value verified. An example authentication value is a message authentication code generated at the time the vault was generated or stored on the computational device. Another example of an authentication value is a digital signature. As one example, the decryption key is the same decryption key as described in 906, or it is a new key that is generated after the decryption key is received in 906 and the vault is decrypted using this key. If a new key is used, in some embodiments, this is performed using a high-quality random generator, such as a physical randomness generator or a cryptographically secure pseudo-random generator. In some embodiments, sensors on the computational device are used to generate true random values, whether for use as a physical randomness generator or to seed a pseudo-random generator. Examples of such sensors include biometric readers, which collect a large amount of high-entropy data. After the matched profile is accessed at 1103, and at least one vault associated with the profile is loaded and accessed, an action is initiated at 1104. An example action is to use a cryptographic key stored in the accessed vault to compute a cryptographic value, such as a digital signature or other authentication value, and send the cryptographic value to an external resource. Alternatively, the action at 1104 is to access an internal resource relative to the computational device, where such an internal data may be an application, data accessible from an application, or similar. In this example case, the key extracted from the vault may be used to decrypt information, such as the data to be accessed, where the encrypted data may be stored on insecure storage. In some embodiments, such data is also authenticated, for example, using a message authentication code (MAC), using a key also stored in the vault. Thus, vaults can store many keys, where each such key may be specific to a particulate usage, and associated with a tag or other descriptor that identifies what it can be used for. This may also be controlled by one or more policies, as described above.

Figure 12:
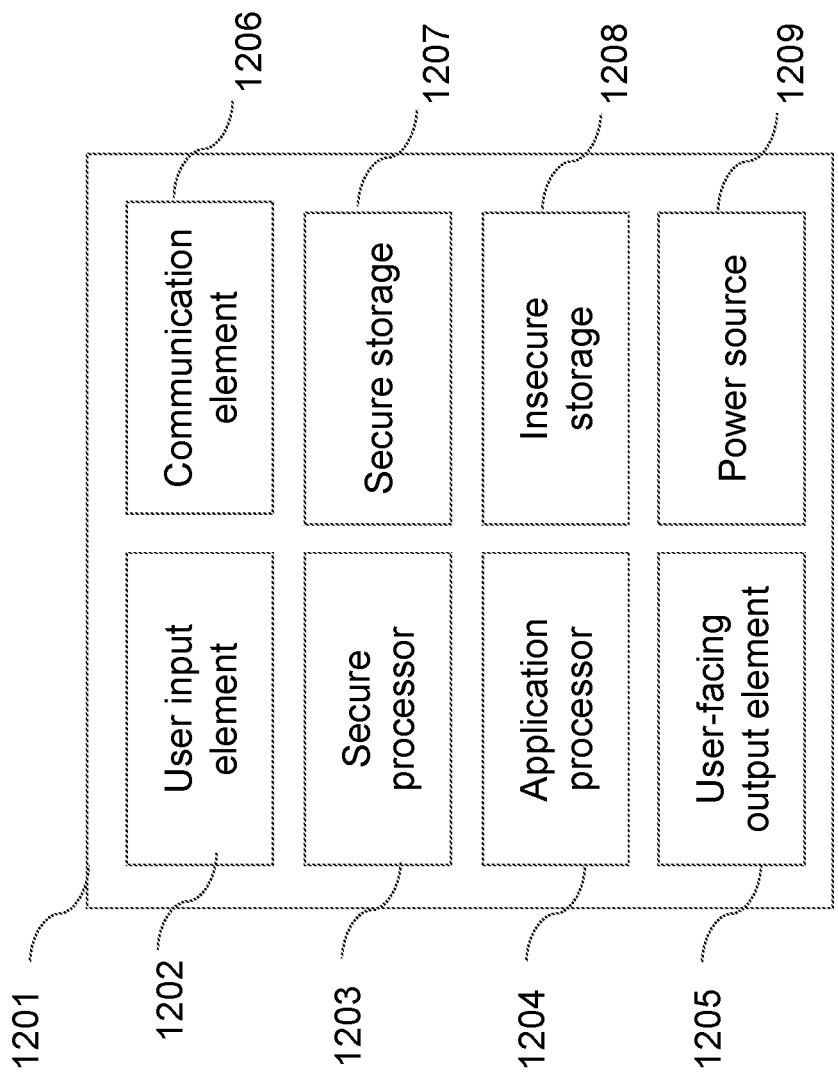
FIG. 12 illustrates an embodiment of a computational device.

FIG. 12 illustrates an embodiment of a computational device. In this example, computational device 1201 includes a user input element 1202 such as a dedicated biometric sensor, a touchscreen, a camera or another input element capable to receive data usable to authenticate a user. As shown in this example, computational device 1201 further includes one or more secure processors 1203, as well as optional one or more application processors 1204. The computational device 1201 further includes a user-facing output element 1204, such as a screen, an LED, a speaker, a haptic element, etc. While a user-facing output element is shown in this example of a computational device, the computational device need not have a user-facing output element, and the techniques described herein may be variously adapted to accommodate computational devices without user-facing output elements. Examples of communication element 1206 include a BLUETOOTH®-enabled radio, a WIFI®-enabled radio, a USB port, a speaker, etc. In this example, secure storage 1207 is accessible only from secure processor 1203, or requires the use of an application programming interface (API) only accessible to secure processor 1203. Thus, in this example, application processor 1204 cannot access secure storage 1207. In this example, insecure storage 1208 can be accessed both by secure processor 1203 and application processor 1204. Computational device 1201 further includes a power source 1209, such as a battery. In some embodiments, power source 1209 is an interface from which power can be obtained from an external device. One example of such an interface used to power a computational device is a USB connector, which receives power to a computational device from a computer it is connected to, or another power source.

Figure 13:
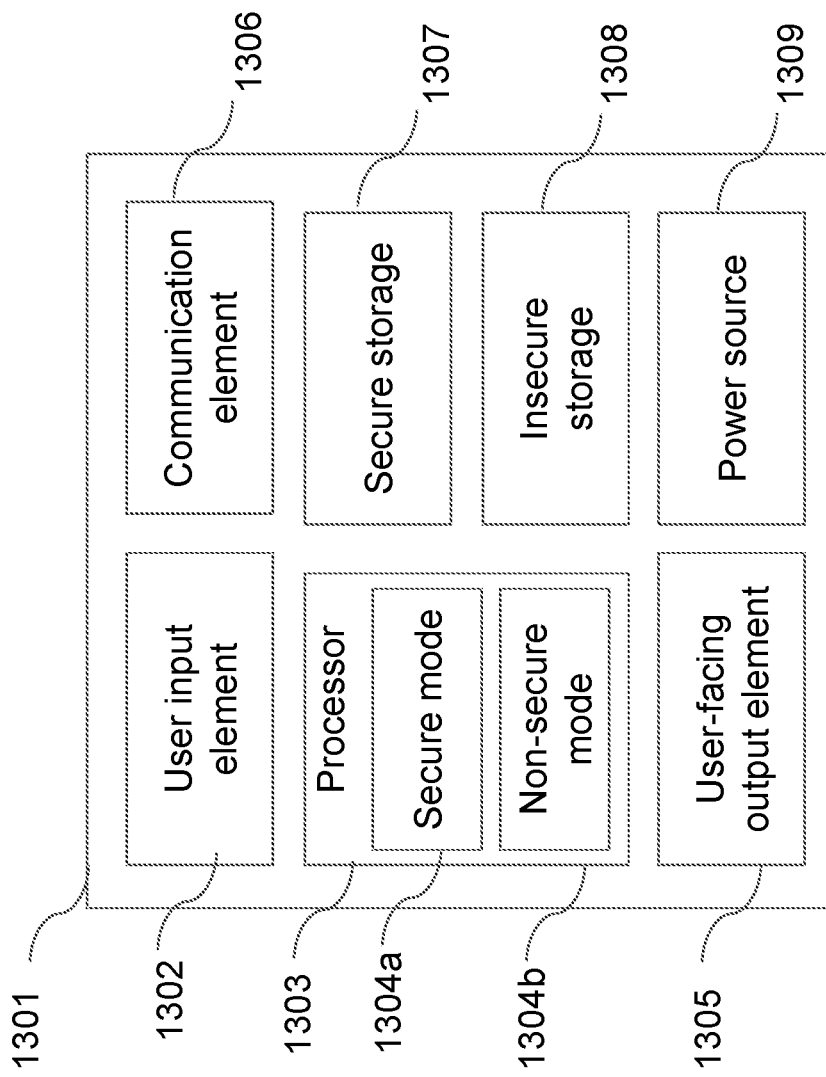
FIG. 13 illustrates an embodiment of a computational device.

FIG. 13 illustrates an embodiment of a computational device. In this example, computational device 1301 includes a user input element 1302 such as a dedicated biometric sensor, a touchscreen, a camera or another input element capable to receive data usable to authenticate a user. In this example, computational device 1301 further includes one or more processors 1303 that can be run in secure mode 1304*a*, or non-secure mode 1304*b*. Computational device 1301 further includes (but need not include) a user-facing output element 1304, such as a screen, an LED, a speaker, a haptic element, etc. In various embodiments, communication element 1306 is a BLUETOOTH®-enabled radio, a WIFI®- enabled radio, a USB port, a speaker, etc. In this example, secure storage 1307 is accessible only from processor 1303 in secure mode 1304*a*, using a restricted interface. Thus, in this example, processor 1303 in non-secure mode 1304*b* cannot access secure storage 1307. In this example, insecure storage 1308 is accessible by processor 1303 both in secure mode 1304*a* and non-secure mode 1304*b*. As shown in this example, the computational device 1301 further includes a power source 1309, such as a battery. In some embodiments, power source 1309 is an interface from which power can be obtained from an external device. One example of such an interface used to power a computational device is a USB connector, which receives power to a computational device from a computer it is connected to, or another power source.

Figure 14:
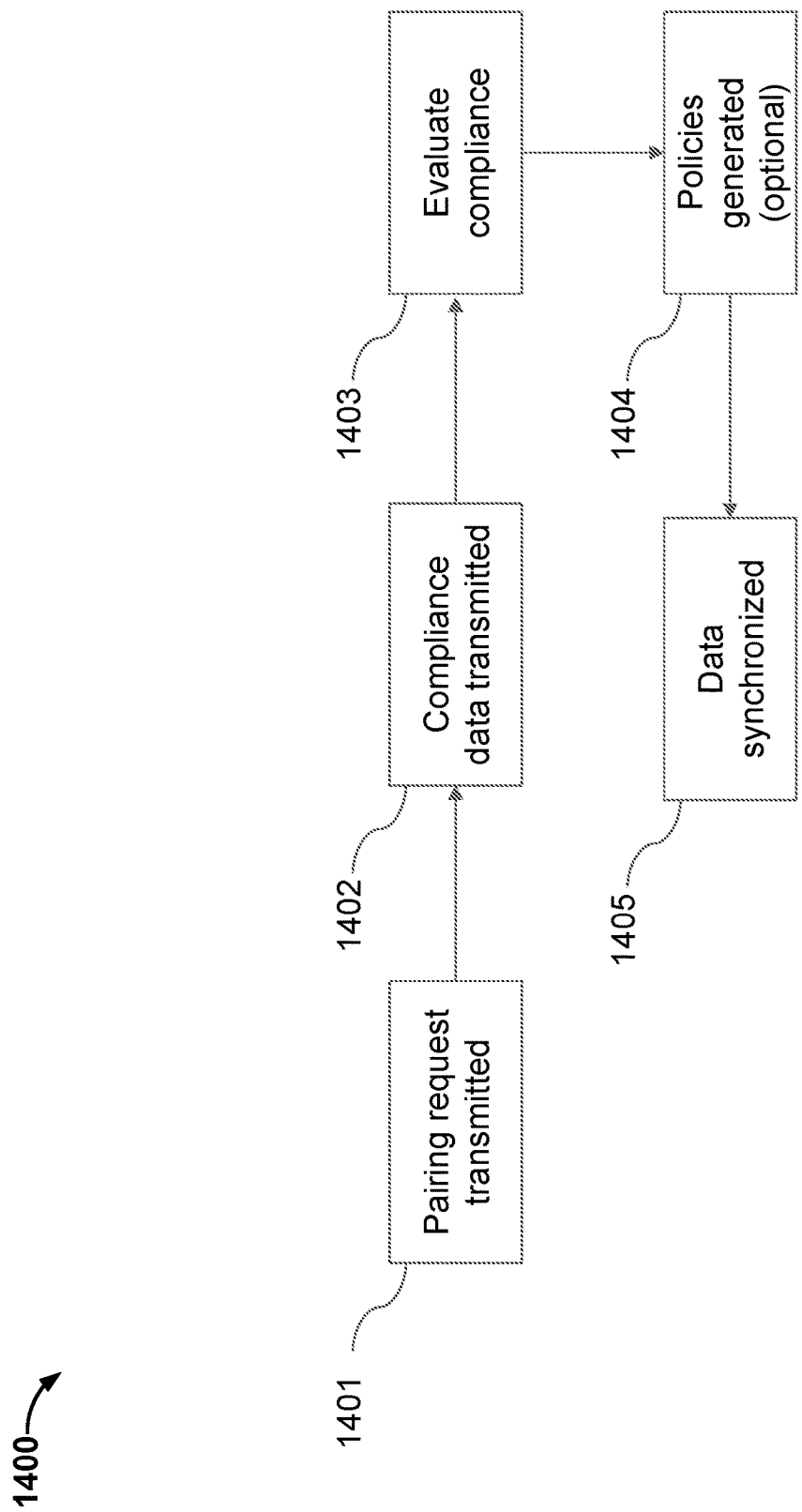
FIG. 14 is a flow diagram illustrating an embodiment of a backup process between two computational devices.

FIG. 14 is a flow diagram illustrating an embodiment of a backup process between two computational devices. In some embodiments, process 1400 illustrates an aspect of the backup process between two computational devices. In some embodiments, process 1400 is executed by one or more computational devices. The process begins at 1401, when a pairing request is transmitted between a first computational device and a second computational device. In this example, suppose a computational device A has a vault requested to be backed up to a computational device B. At 1402, device A receives compliance data related to computational device B. In some embodiments, the compliance data includes a description of the system of computational device B, which includes, for example a serial number, a hardware version specification, data describing the software configuration and its versions, a description detailing hardware attachments, software plugins, etc. In some embodiments, at least part of the compliance data is digitally signed by a trusted third party, such as a manufacturer, anti-virus vendor, an employer of the user, a financial institution, insurance company, etc. In some embodiments, aspects or portions of the compliance data are digitally signed by a first trusted party while other aspects of the compliance data are signed by a second trusted party. In some embodiments, the compliance data also includes digital certificates and other data usable to assess risk, such as usage logs associated with computational device B. In some embodiments, the compliance data is transmitted over a secure channel. In some embodiments, at least some of the compliance data is sent from a third party repository or service provider while at least some of the compliance data is sent from computational device B. At 1403, computational device A or a party associated with it evaluates the compliance data and determines whether computational device B is in compliance (e.g., matches the requirements specified by one or more policies associated with at least one of the requested vault and computational device A). For example, computational device B is determined to be compliant if it is associated with a whitelisted hardware configuration and satisfies a minimum requirement for software configuration, such as having a sufficiently recent operating system installed. At 1404, new policies addressing what the vault can be used for are generated. For example, if the compliance verification in step 1403 determines that computational device B is in partial compliance but not in full compliance, a policy restricting the use of the vault may be generated and associated with the copy of the vault to be transmitted to computational device B. At 1405, the two computational devices engage in a synchronization of data in which at least part of the requested vault information is transmitted to computational device B. In some embodiments, if there are future changes to the vault information, a notification is transmitted from the computational device where the modification was performed or observed to other entities, such as other computational devices and cloud storage repositories and service providers assisting in synchronization processes. An analogous process can be used if the requested vault is requested from computational device B from a cloud storage unit.

Figure 15:
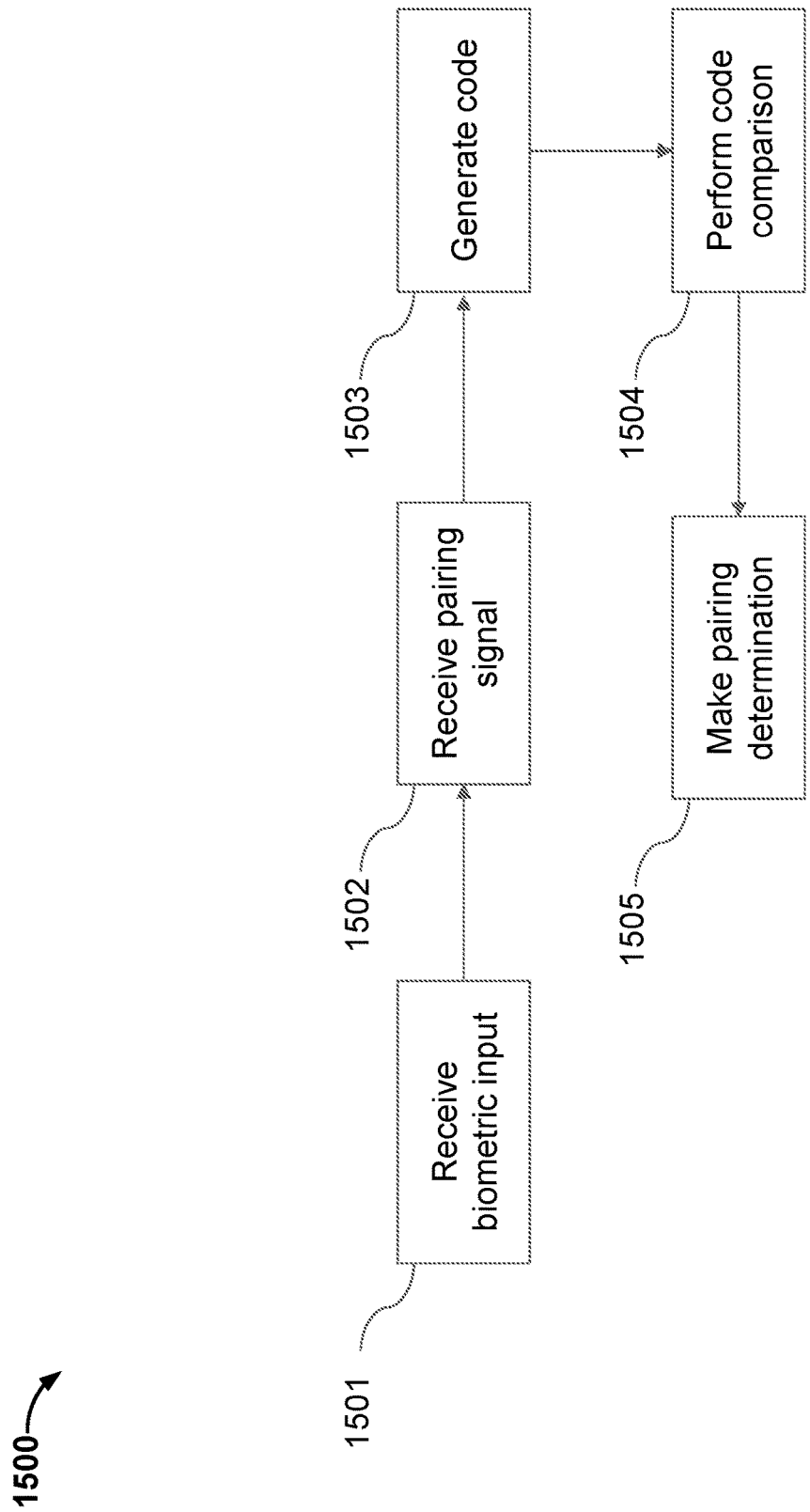
FIG. 15 is a flow diagram illustrating an embodiment of a pairing process.

FIG. 15 is a flow diagram illustrating an embodiment of a pairing process. In some embodiments, process 1500 illustrates an aspect of an example pairing process. In some embodiments, process 1500 is executed by a computational device. The process begins at 1501, when a first computational device receives a biometric input, such as a fingerprint, face biometric data, voice data, typing behavior, etc. This may be received from a built-in sensor, such as a fingerprint sensor, or it may be received from a device the first computational device is in communication with, such as a connected keyboard. At 1502, the first computational device receives a pairing signal, such as data related to a distance-bounding protocol, a code input by a user, accelerometer data indicating a time series of movement data, etc. At 1503, a code is generated. In some embodiments, the code is generated from the biometric data. The code may also be generated from the pairing signal data. In some embodiments, the code is generated in a manner that is robust to minor errors. As one example, the code is generated at least in part from a key generated from the biometric data. For example, an approach that is robust to minor modifications of the input data may be used, where robust entropy is extracted from biometric data of various types. Alternatively, key data is extracted from biometric data. In some embodiments, the code is set as the combination of a key derived using such an approach, and a function of at least some of the pairing signal. If a fuzzy pairing signal such as accelerometer data is used, a similar process of extracting a robust key from the pairing signal may be used. If non-fuzzy pairing data is used, in some embodiments such data is appended to the key extracted from fuzzy data, such as biometric data and accelerometer data. The result is, for example, a code. In some embodiments, another code is computed by a second computational device in an analogous manner. At 1504, the code computed by the first computational device is compared to the code computed by the second computational device. In some embodiments, this is done by communication of the code from one of these devices to the other, or by a user entering the code from one device into the other device, or a user input unit associated with the other device. In some embodiments, it is performed using a socialist millionaires' protocol. In response to the comparison, the first computational device makes a pairing determination at 1505, where this determination reflects whether the codes compared matched or not. If the codes match, the pairing is determined to have succeeded, otherwise not.

Although the foregoing embodiments have been described in some detail for purposes of clarity of understanding, the invention is not limited to the details provided.

There are many alternative ways of implementing the invention. The disclosed embodiments are illustrative and not restrictive.

What is claimed is:

1. A system, comprising:
one or more processors configured to:
receive, at a first device, an indication of a request to perform an action associated with a user;
access at least one record stored on the first device, the at least one record including:
authentication information associated with the user, the authentication information comprising biometric data; and
credential information comprising a cryptographic key;
receive biometric authentication input from the user;
determine that the biometric authentication input from the user matches the authentication information associated with the user included in the at least one record stored on the first device;
retrieve at least a portion of the credential information from the at least one record stored on the first device;
facilitate the action at least in part by transmitting, from the first device, output based at least in part on the at least portion of the credential information retrieved from the at least one record; and
initiate a backup, to a second device, of at least a portion of the at least one record, wherein initiating of the backup to the second device is based at least in part on the second device satisfying a policy used to determine approved computational devices, wherein satisfying the policy comprises the second device being associated with a given Internet Protocol (IP) range, and wherein the given Internet Protocol (IP) range comprises an IP address from which the first device has previously been observed; and
a memory coupled to the one or more processors and configured to provide the one or more processors with instructions.

2. The system recited in claim 1, wherein the cryptographic key is used to facilitate access to encrypted data.

3. The system recited in claim 1, wherein a digital signature is determined based at least in part on the cryptographic key.

4. The system recited in claim 1, wherein the cryptographic key is used to authenticate the user to an external entity.

5. The system recited in claim 1, wherein the cryptographic key is used to authenticate the first device to an external entity.

6. The system recited in claim 1, wherein the cryptographic key is used to facilitate access to a resource.

7. The system recited in claim 1, wherein facilitating the action is based at least in part on one or more policies associated with the at least one record.

8. The system recited in claim 1, wherein the at least one record is stored in a secure storage.

9. The system recited in claim 8, wherein the secure storage is accessed using a restricted interface.

10. The system recited in claim 8, wherein the secure storage is implemented on a System on Chip (SoC).

11. The system recited in claim 1, wherein satisfying the policy comprises the second device having at least a minimum security level.

12. The system recited in claim 1, wherein the policy is updated based at least in part on information relating to a security incident.

13. The system recited in claim 1, wherein initiating the backup comprises providing of a key usable to access the at least one record.

14. The system recited in claim 13, wherein the key is provided by the first device to the second device.

15. The system recited in claim 14, wherein the key is provided by the first device to the second device subsequent to a pairing of the first device with the second device.

16. A method, comprising:
receiving, at a first device, an indication of a request to perform an action associated with a user;
accessing at least one record stored on the first device, the at least one record including:
authentication information associated with the user, the authentication information comprising biometric data; and
credential information comprising a cryptographic key;
receiving biometric authentication input from the user;
determining that the biometric authentication input from the user matches the authentication information associated with the user included in the at least one record stored on the first device;
retrieving at least a portion of the credential information from the at least one record stored on the first device;
facilitating the action at least in part by transmitting, from the first device, output based at least in part on the at least portion of the credential information retrieved from the at least one record; and
initiating a backup, to a second device, of at least a portion of the at least one record, wherein initiating of the backup to the second device is based at least in part on the second device satisfying a policy used to determine approved computational devices, wherein satisfying the policy comprises the second device being associated with a given Internet Protocol (IP) range, and wherein the given Internet Protocol (IP) range comprises an IP address from which the first device has previously been observed.

17. The method of claim 16, wherein the cryptographic key is used to facilitate access to encrypted data.

18. The method of claim 16, wherein a digital signature is determined based at least in part on the cryptographic key.

19. The method of claim 16, wherein the cryptographic key is used to authenticate the user to an external entity.

20. The method of claim 16, wherein the cryptographic key is used to authenticate the first device to an external entity.

21. The method of claim 16, wherein the cryptographic key is used to facilitate access to a resource.

22. The method of claim 16, wherein facilitating the action is based at least in part on one or more policies associated with the at least one record.

23. The method of claim 16, wherein the at least one record is stored in a secure storage.

24. The method of claim 23, wherein the secure storage is accessed using a restricted interface.

25. The method of claim 23, wherein the secure storage is implemented on a System on Chip (SoC).

26. The method of claim 16, wherein satisfying the policy comprises the second device having at least a minimum security level.

27. The method of claim 16, wherein the policy is updated based at least in part on information relating to a security incident.

28. The method of claim 16, wherein initiating the backup comprises providing of a key usable to access the at least one record.

29. The method of claim 28, wherein the key is provided by the first device to the second device.

30. The method of claim 29, wherein the key is provided by the first device to the second device subsequent to a pairing of the first device with the second device.

* * * * *